(12) United States Patent
Malik et al.

(10) Patent No.: US 11,449,317 B2
(45) Date of Patent: Sep. 20, 2022

(54) DETECTION OF SEMANTIC EQUIVALENCE OF PROGRAM SOURCE CODES

(71) Applicant: RED HAT, INC., Raleigh, NC (US)

(72) Inventors: Viktor Malik, Brno (CZ); Tomas Glozar, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 123 days.

(21) Appl. No.: 16/546,167

(22) Filed: Aug. 20, 2019

(65) Prior Publication Data
US 2021/0055919 A1 Feb. 25, 2021

(51) Int. Cl.
*G06F 8/41* (2018.01)

(52) U.S. Cl.
CPC ............... *G06F 8/42* (2013.01); *G06F 8/433* (2013.01)

(58) Field of Classification Search
CPC ............. G06F 8/42; G06F 8/433; G06F 8/436
See application file for complete search history.

(56) References Cited

U.S. PATENT DOCUMENTS

| | | | |
|---|---|---|---|
| 6,260,190 B1* | 7/2001 | Ju | G06F 8/445 |
| | | | 712/205 |
| 9,104,434 B2 | 8/2015 | Miadowicz et al. | |
| 9,612,806 B2 | 4/2017 | Conrad et al. | |
| 2012/0254827 A1* | 10/2012 | Conrad | G06F 8/35 |
| | | | 717/104 |
| 2013/0019224 A1* | 1/2013 | Madl | G06F 8/10 |
| | | | 717/104 |
| 2016/0378445 A1* | 12/2016 | Kashiwagi | G06F 8/77 |
| | | | 717/143 |
| 2017/0242671 A1* | 8/2017 | Edler Von Koch | G06F 8/4435 |
| 2017/0331850 A1* | 11/2017 | Li | H04L 63/1433 |
| 2018/0285101 A1* | 10/2018 | Yahav | G06F 8/75 |
| 2020/0008949 A1* | 1/2020 | Fonte | A61F 2/30749 |

OTHER PUBLICATIONS

Katayama, S. (2019). "Efficient Exhaustive Generation of Functional Programs using Monte-Carlo Search with Iterative Deepending". University of Miyazaki. 12 pages.
Pankaj. Software Engineering Control Flow Graph (CFG). downloaded https://www.geeksforgeeks.org/software-engineering-control-flow-graph-cfg/ on Aug. 12, 2019, 9 pages.
Le, W. (2016). "Lecture 4. Control Flow Analysis" 59 pages.
Lahiri, S.K. et al. "SymDiff: A Language-agnostic Semantic Diff Tool for Imperative Programs". 7 pages.

\* cited by examiner

*Primary Examiner* — Duy Khuong T Nguyen
(74) *Attorney, Agent, or Firm* — Lowenstein Sandler LLP

(57) ABSTRACT

Implementations of the disclosure provide systems and methods for identifying, in view of a first control flow graph associated with a first code fragment and a second control flow graph associated with a second code fragment, a first set of sections of the first code fragment and a second set of sections of the second code fragment, such that each section of the first set of sections has a corresponding section of the second set of sections. A first section of the first set of sections is identified, where the first section is not syntactically equivalent to a corresponding second section of the second set of sections. Responsive to determining that the first section is not syntactically equivalent to the corresponding second section, it is found that the first code fragment is not semantically equivalent to the second code fragment.

20 Claims, 14 Drawing Sheets

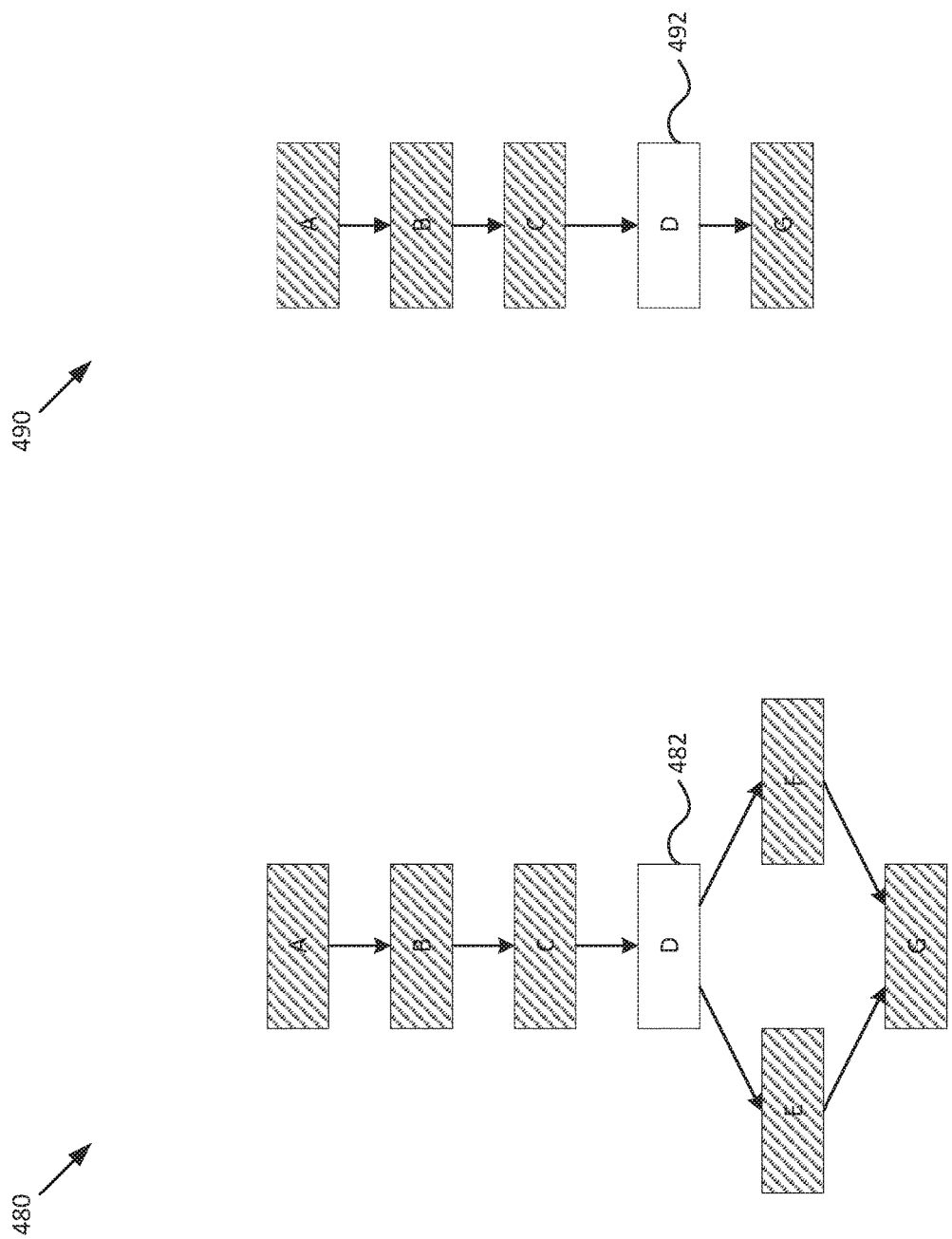

750

```
┌─────────────────────────────────────────────────────────────────────────────┐
│ Identify a first section of the first code fragment that includes a first   │
│ function and a second section of the second code fragment that does not     │
│ include a corresponding second function                                      │
│                              752                                             │
└─────────────────────────────────────────────────────────────────────────────┘
                                     │
                                     ▼
┌─────────────────────────────────────────────────────────────────────────────┐
│ Identify a third set of sections from a third code fragment where each       │
│ section of the third set of sections has a second corresponding second       │
│ section  754                                                                 │
└─────────────────────────────────────────────────────────────────────────────┘
                                     │
                                     ▼
                         ◇ Is a third section
                    YES    syntactically equivalent to a    NO
                           second corresponding section?
                                    756
```

- YES → ◇ Are all third sections syntactically equivalent to all corresponding second section? 758
  - YES → Determine the first section is semantically equivalent to the second section 760
  - NO → Determine first section is not semantically equivalent to the second section 762
- NO → Determine first section is not semantically equivalent to the second section 762

FIG. 7B

DETECTION OF SEMANTIC EQUIVALENCE OF PROGRAM SOURCE CODES

TECHNICAL FIELD

Embodiments of the present disclosure relate to a computer system, and more specifically, relate to detecting semantic equivalence of program source codes.

BACKGROUND

Source code is a list of human-readable instructions that a programmer writes when developing software. Compilers are used to translate the source code into object code comprising a sequence of executable instructions.

BRIEF DESCRIPTION OF THE DRAWINGS

The disclosure is illustrated by way of example, and not by way of limitation, and may be more fully understood with references to the following detailed description when considered in connection with the figures, in which:

FIG. 4E illustrates another first reduced CFG and another second reduced CFG, in accordance with implementations of the present disclosure.

FIG. 7B is a flow diagram of another method for determining whether a first section of a first code fragment is semantically equivalent to a corresponding second section of a second code fragment, in accordance with implementations of the present disclosure.

DETAILED DESCRIPTION

Figure 1:
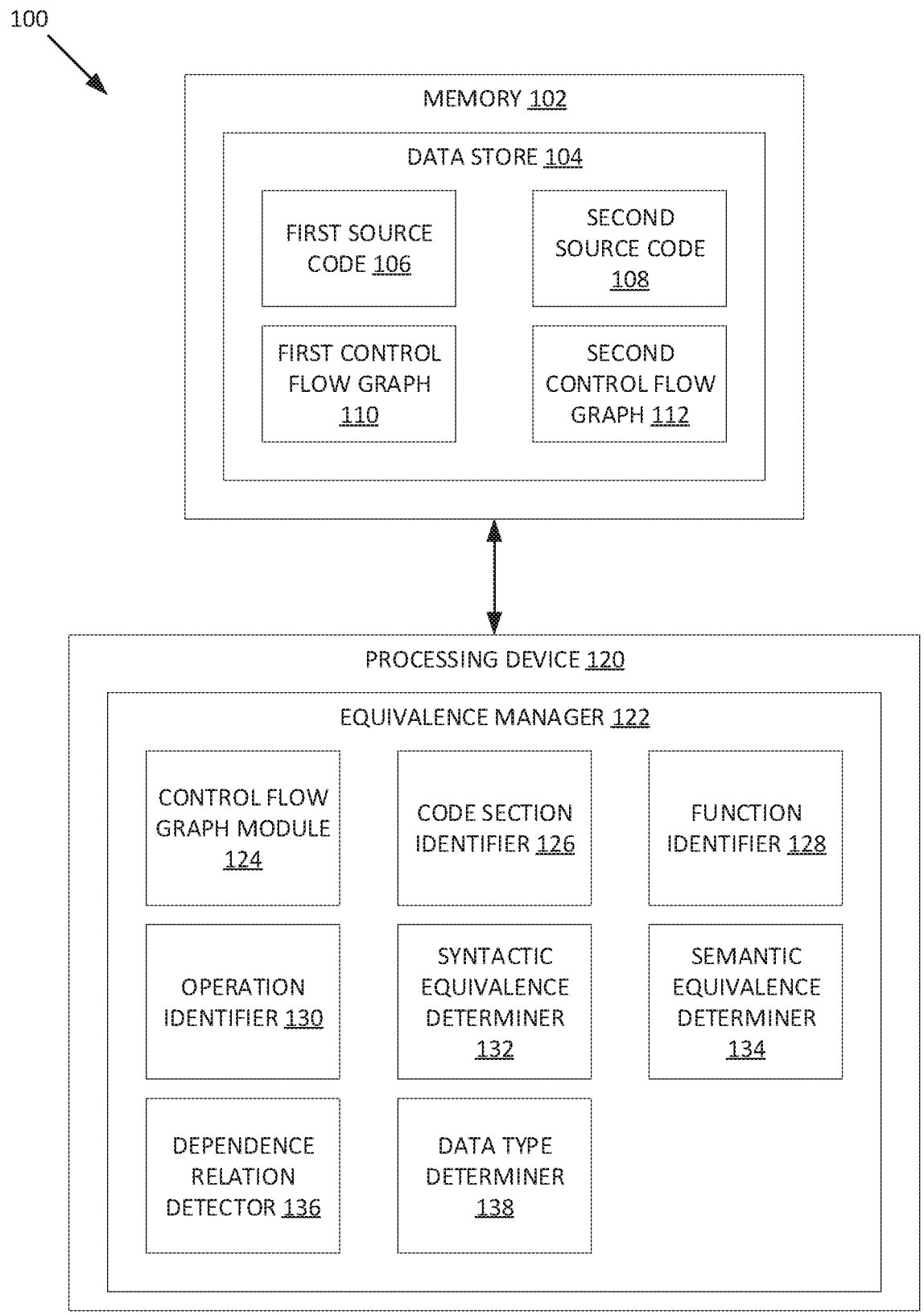
FIG. 1 is a block diagram of an example computing system in which embodiments of the disclosure may operate.

Software developers frequently may change one or more portions of a program source code in the process of developing and/or maintaining software. For example, a developer may change a portion of a program source code in order to fix a bug present in the software. In other examples, a developer may change one or more portions of the program source code in order to enable the software to be compatible with different computer systems. By changing one or more portions of the program source code, a developer may generate one or more different versions of the program source code. Thus, throughout the life of a program, multiple versions of the program source code may be generated.

Frequently, a software developer may attempt to identify one or more differences between two versions of a program source code. Conventionally, a developer may attempt to identify textual differences between the two versions of the program source code (e.g., by comparing the two source code files). However, the mere presence of textual differences between two source code fragments is not always indicative of the different behavior of the executable code modules that may be generated by compiling the two source code fragments: e.g., changing names of one or more variables and/or changing the order of function definitions in the source code would not necessarily lead to a different behavior of the executable code modules that may be generated by compiling the two source code fragments.

Another technique for detecting code differences is to compile and execute the first program source code and the second program source code using a set of parameter values for each execution to determine whether the same result is produced by two executable modules derived from the two source code fragments. However, using this technique, a developer may be unable to test every parameter value that may be utilized for executing the two executable modules. Further, the developer may be unable to identify a particular portion of program source code that is responsible for the detected differences in executing the two executable modules.

Aspects of the present disclosure address the above-mentioned and other deficiencies by providing methods of detecting a semantic equivalence between two or more versions of a program source code. A structural representation of each version of a program source code may be generated for use in comparing the program source codes. In some embodiments, the structural representation may be a control flow graph (CFG), discussed in further detail herein. Each program source code representation may be compared to another program source code representation in order to identify one or more sections of each program source code that are not syntactically equivalent to a corresponding section of another program source code. In response to identifying one or more sections that are not syntactically equivalent, each identified section of the program source code may be compared to a corresponding section of another program source code in an attempt to identify one or more sections that are not semantically equivalent to a corresponding section of another program source code. The identified sections of the program source code that are not semantically equivalent to a corresponding section of another program source code may be presented to a user of a computer system for taking an action or performing further analysis.

Implementations of this disclosure overcome the noted deficiencies of conventional systems by identifying one or more sections of a first program source code and a second program source code that are neither syntactically nor semantically equivalent. By identifying portions of the first program source code and the second program source code that are not syntactically equivalent, a semantic analysis may be performed only on the code fragments that are not syntactically equivalent (i.e., portions of the first program source code that have likely been modified in generating the second program source code). By reducing the size of code fragments that are being subjected to the semantic analysis, the overall computational complexity of the code comparison task is significantly reduced.

FIG. 1 is a block diagram of an example computing system 100 in which embodiments of the disclosure may operate. Computing system 100 may provide a development environment or a production environment and may enable a user to develop, configure, test and deploy programs. In one example, computing system 100 may be the same or similar to RedHat® OpenShift®, Microsoft® Azure Devops®, Oracle® Application Express® (APEX), or other web-based or non-web-based development platform.

Computing system 100 may be a single computing machine or multiple computing machines arranged in a homogeneous or heterogeneous group (e.g., cluster, grid, server farm). Computing system 100 may include one or more rack mounted servers, workstations, desktop computers, notebook computers, tablet computers, mobile phones, palm-sized computing devices, personal digital assistants (PDAs), etc. In one example, computing system 100 may be a computing device implemented with x86 hardware. In another example, computing system 100 may be a computing device implemented with PowerPC®, SPARC®, other hardware, or a combination thereof. In either example, computing system 100 may include one or more hardware resources.

Computing system 100 may include one or more physical central processing units (CPUs) 120 (referred to as "processor" or "processing device") communicatively coupled to a memory device 102 (referred to as "memory"). Processing device 120 may also be communicatively coupled to a network interface controller (NIC) (not shown). Local components within computing system 100, including connections between processing device 120, memory device 102, and the NIC may be provided by one or more local buses (not shown) of suitable architecture.

"CPU," "processor," or "processing device" herein shall refer to a device capable of executing instructions encoding arithmetic, logical, or I/O operations. In an illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor, which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

"Memory device" herein shall refer to a volatile or non-volatile memory device, such as random access memory (RAM), read only memory (ROM), electrically erasable programmable read-only memory (EEPROM), or any other device capable of storing data. "Network interface controller" herein shall refer to a device capable of implementing a physical layer and data link layer standard (such as Ethernet or InfiniBand).

Memory 102 may include at least one memory component, or multiple memory components. Memory 102 may include a data store 104. Data store 104 may be referred to as a source code repository, a program repository, an image repository, a document repository, other repository, or a combination thereof. Data store 104 may include a single data storage device or multiple storage devices and may store data as one or more file system objects (e.g., files, directories), database objects (e.g., records), data blobs (e.g., continuous or non-continuous bit series), other data storage objects, or a combination thereof.

Data store 104 may store at least a first source code module 106 and a second source code module 108. In some embodiments, first source code module 106 and second source code module 108 may be stored in a program source code file. In other embodiments, first source code module 106 may be stored in a first program source code file and second source code module 108 may be stored in a second program source code file. Data store 104 may also store a first CFG 110 and a second CFG 112. First CFG 110 may be derived from first source code module 106 and second CFG 112 may be derived from second source code module 108. Further details regarding deriving a CFG from a source code module are provided herein.

Program source code is a list of human-readable instructions that a programmer writes when developing software. Program source code may be written in a high-level programming language that is translated to a lower level language (e.g., assembly language, object code, or machine code) to create an executable program. In some embodiments, second source code module 108 may be a later version of at least a portion of first source code module 106. For example, first source code module 106, when executed, may produce a first sequence of executable instructions to be executed by a processing device to create a first program. A developer may modify one or more portions of first source code module 106, thereby creating second source code module 108. Second source code module 108, when executed, may produce a second sequence of executable instructions to be executed by the processing device to create a second program. The second executable file may be a later version of the first executable. As such, the second sequence of executable instructions, when executed, may create a second program that is a later version of the first program.

First source code module 106 may include one or more first code fragments. Each first code fragment may include one or more lines of code, where each line of code includes an operation that is performed in execution of first source code module 106. In some embodiments, each first code fragment may be split into one or more first sections, including one or more operations of the first code fragment. Similarly, second source code module 108 may include one or more second code fragments that may be similarly split into one or more second sections.

First CFG 110 may be a structural representation of first one or more code fragments of first source code module 106. Similarly, second CFG 112 may be a structural representation of one or more second code fragments of second source code module 108. A CFG may include one or more nodes where each node represents at least a section of a code fragment. Each node may be connected to at least another node by an edge. In some embodiments, the edges may be directed and/or weighted. Multiple nodes may be grouped together within the CFG to represent a flow path that may be traversed by a program during executing. Each node may be organized based on an ordering for each operation, associated with each node, in the program source code.

Equivalence manager 122 may be executed by processing device 120 to detect a semantic equivalence between first source code module 106 and second source code module 108. Equivalence manager 122 may include a CFG module 124, a code section identifier 126, a function identifier 128, an operation identifier 130, a syntactic equivalence determiner 132, a semantic equivalence determiner 134, a dependence relation detector 136, and a data type identifier 138. Alternatively, the functionality of one or more of CFG module 124, code section identifier 126, function identifier 128, operation identifier 130, syntactic equivalence determiner 132, semantic equivalence determiner 134, dependence relation detector 136, or data type identifier 138 may be combined into a single module or divided into multiple sub-modules.

CFG module 124 may generate a CFG representing a program source code module. For example, CFG module 124 may generate a first CFG 110 based on a first source code fragment of first source code module 106. CFG module 124 may similarly generate second CFG 112 based on a second source code fragment of second source code module 108. In various embodiments, first CFG 110 and second CFG 112 may be generated by a compiler or by a standalone CFG generator.

Code section identifier 126 may identify one or more sections of first source code module 106 and second source code module 108 for syntactic and semantic analysis, in accordance with embodiments described herein. In some embodiments, code section identifier 126 may identify a first code fragment of first source code module 106 and a second code fragment of second source code module 108. In further embodiments, code section identifier 126 may identify a first section of the first code fragment where the first section corresponds to a second section of the second code fragment, in accordance with embodiments described herein.

Function identifier 128 may identify an invocation of a function in first source code module 106 and/or second source code module 108. A function is a portion of code that receives zero or more parameters, performs a specific task, and returns the execution control to the invoker. Function identifier 128 may identify an invocation of the function in first source code module 106 and/or second source code module 108 by parsing each section of each code fragment of first source code module 106 and second source code module 108 to detect one or more calls to a function. A call to a function may be an operation of a program source code that invokes the function and, in some embodiments, provides one or more input parameter values for execution of the function. Additionally, function identifier 128 may identify a section of a program source code that defines the function being invoked. A definition of a function may include one or more operations to be performed in execution of the function. In some embodiments, function identifier 128 may identify an invocation of a first function in first source code module 106. Similarly, an invocation of a corresponding second function in second source code module 106. The first function may be compared with the corresponding second function to determine whether the first function is syntactically and/or semantically equivalent to the corresponding second function. If a corresponding second function is not included in second source code module 108, the first function may be compared with a second section of second source code module 108 that includes code that, when executed, behaves similarly to the first function, when executed.

Operation identifier 130 may identify one or more operations of a function to be performed in execution of the function. In some embodiments, operation identifier 130 may identify one or more operations of a first function to be compared to one or more operations of a second section of second source code module 108. By comparing one or more operations identified by operation identifier 130 to one or more portions of the second section, it may be determined whether the first function is semantically equivalent to the second section, even though the second section does not include a second function corresponding to the first function.

In some embodiments, the functionality of one or more of code section identifier 126, function identifier 128, or operation identifier 130 may be performed by one or more modules executed by equivalence manager 122.

Figure 4A:
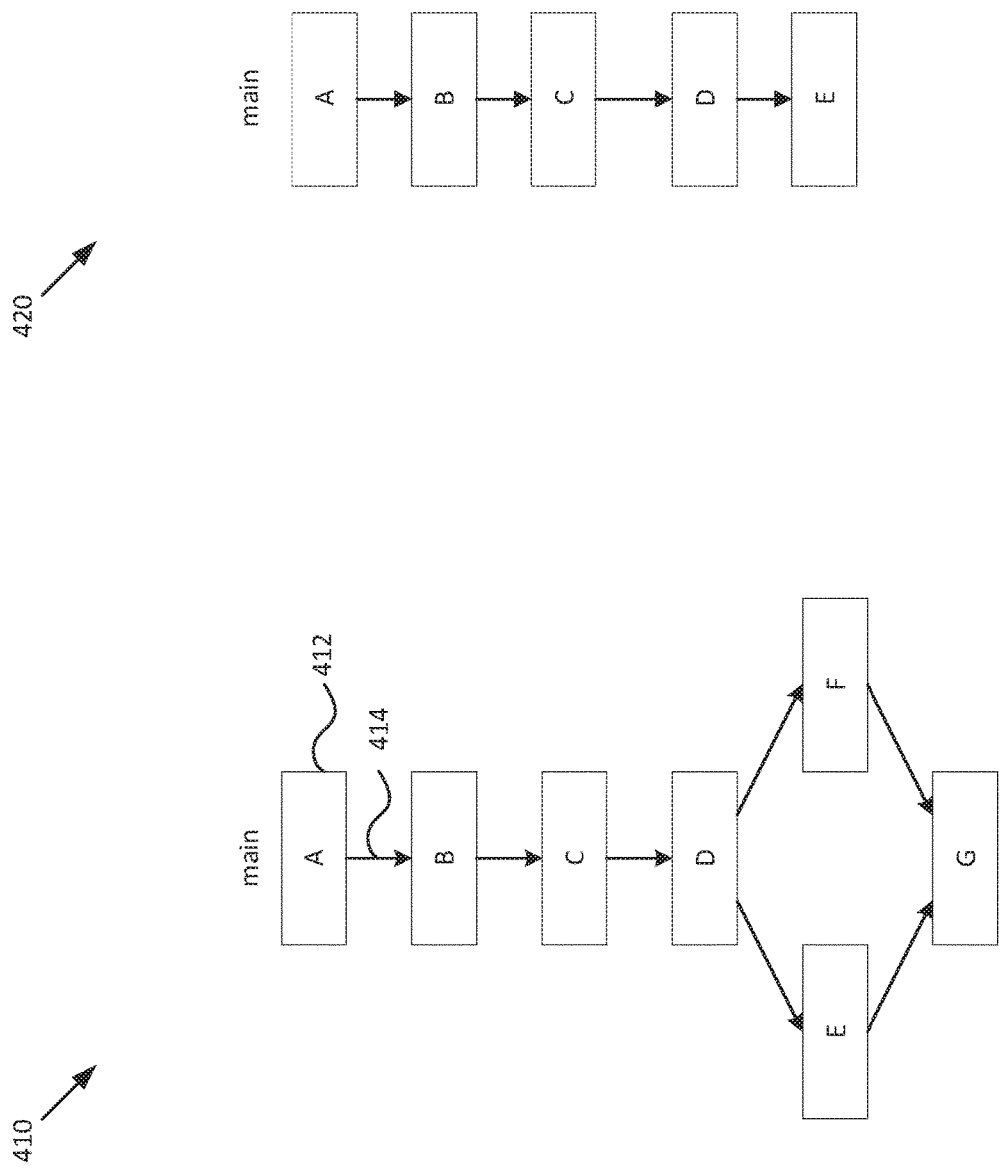
FIG. 4A illustrates a first CFG and a second CFG for syntactic comparison, in accordance with implementations of the present disclosure.
Figure 4B:
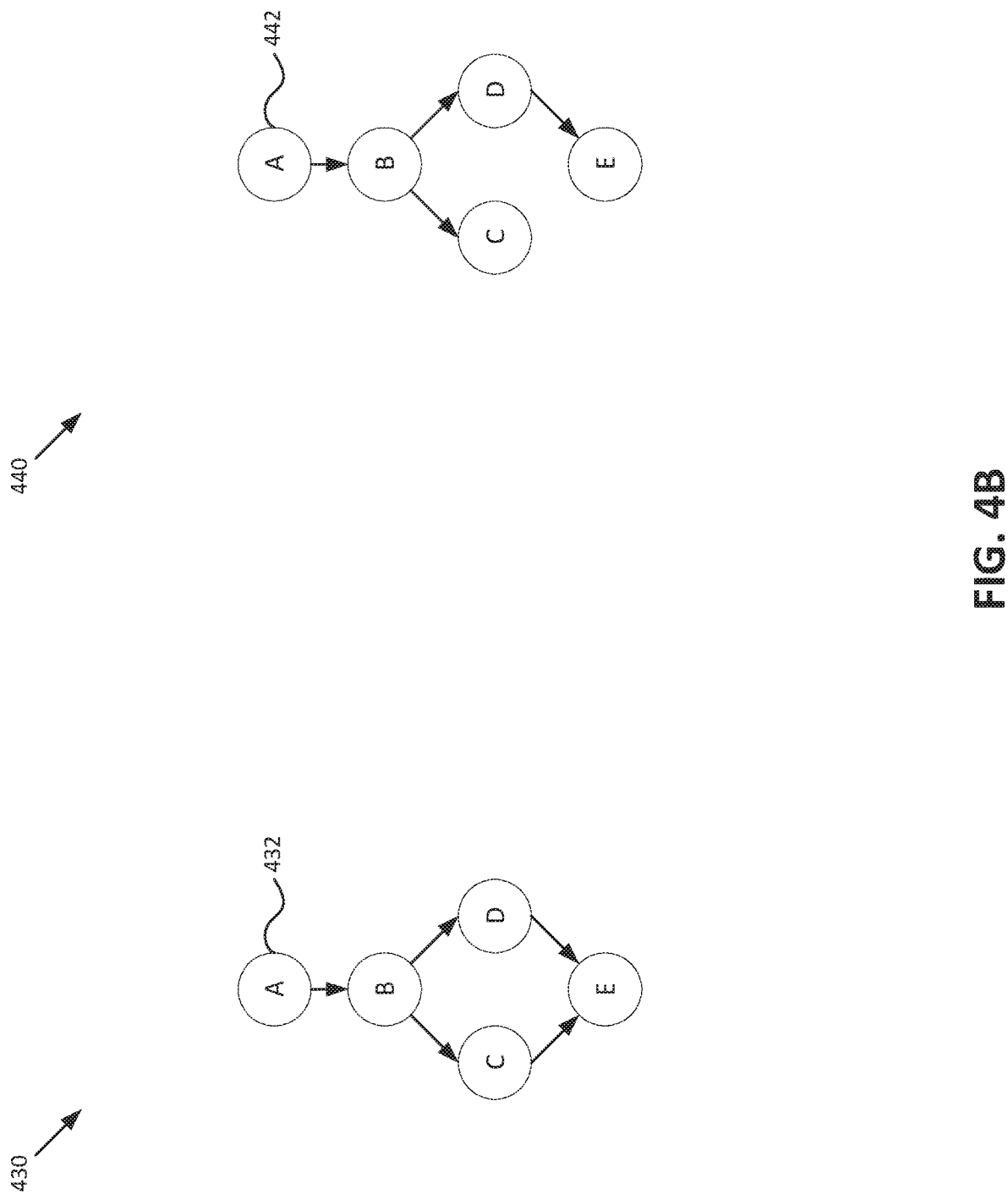
FIG. 4B further illustrates a third CFG and a fourth CFG representing a third code fragment and a fourth code fragment respectively, in accordance with implementations of the present disclosure.
Figure 4C:
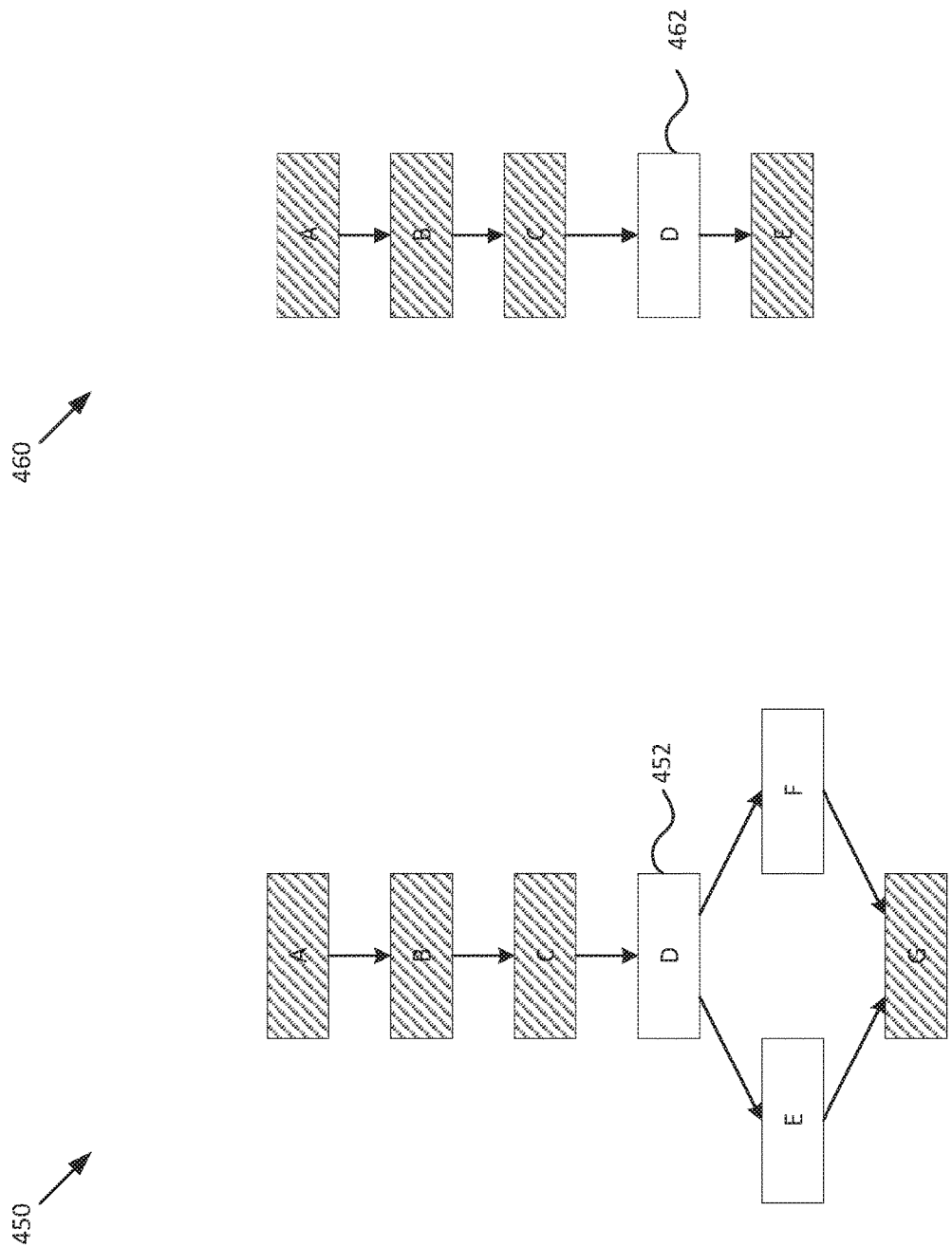
FIG. 4C illustrates a first reduced CFG and a second reduced CFG for semantic comparison, in accordance with implementations of the present disclosure.

Syntactic equivalence determiner 132 may determine a syntactic equivalence between a first section of first source code module 106 and a corresponding second section of second source code module 108, in accordance with embodiments discussed with respect to FIGS. 4A-4C. The first section may be syntactically equivalent to the second section if the code associated with the first section and the code associated with the second section have the same structural form (i.e., the same or similar textual elements have a same or similar organization). Syntactic equivalence determiner 132 may further determine a first set of first sections and a second set of second sections where each first section of the first set of first sections is not syntactically equivalent to a corresponding second section of the second set of second sections. Semantic equivalence determiner 134 may determine a semantic equivalence between each first section of the first set of first sections and a corresponding second section of the second set of second sections, in accordance with embodiments of the present disclosure.

Dependence relation detector 136 may detect a dependence relation between a first operation and a second operation of either first source code module 106 or second source code module 108. A dependence relation between two operations may exist if one operation utilizes data produced by another operation, (i.e., the first operation accesses a location of memory 102 to write data to the memory location and the second operation accesses the memory location to read data from the memory location). Dependence relation detector 136 may detect a dependence relation by identifying memory location accessed by the first operation and the second operation. If the memory location accessed by the first operation is the same memory location that is accessed by the second operation, dependence relation detector 136 may determine whether the first operation, when executed, is to write data to the memory location and whether the second operation, when executed, is to read data from the memory location. In response to determining that the first operation is to write data to the memory location and the second operation is to read data from the memory location, dependence relation detector 136 may determine that a dependence relation exists between the first operation and the second operation.

Data type identifier 138 may determine whether a first user-defined type included in a first section of first source code module 106 corresponds to a second user-defined type included in a second section of second source code module 108. A user-defined data type 114 may be a data type, defined by a user of a program source code, that indicates a category of a data item. A complex data type (e.g., a user-defined structure) may include two or more fields, where each field is associated with a field label and a field data type. When a program utilizing a user-defined data type is executed, each field identifier may be translated to a memory address indicating a portion of memory 102 where data associated with the user-defined data type is stored. Using the respective memory addresses of the fields of the user-defined structure, data of each field may be accessed at the memory 102.

In some embodiments, first source code module 106 may include a first user-defined type and second source code module 108 may include a second user-defined type. Data type identifier 138 may determine whether the first user-defined data type is the same as the second user-defined data type. Data type identifier 138 may compare a first field label of the first user-defined data type with a second field label of the second user-defined data type. In some embodiments, data type identifier 138 may compare a first memory address of the first user-defined data type to a second memory address of the second user-defined data type. In some embodiments, data type identifier 138 may determine that the first user-defined data type corresponds to the second user-defined data type if the first field label is the same as the second field label, or if the first memory address is the same as the second memory address. Further details and embodiments relating to comparing the first user-defined data type to the second user-defined data type are described in further detail herein.

Figure 2:
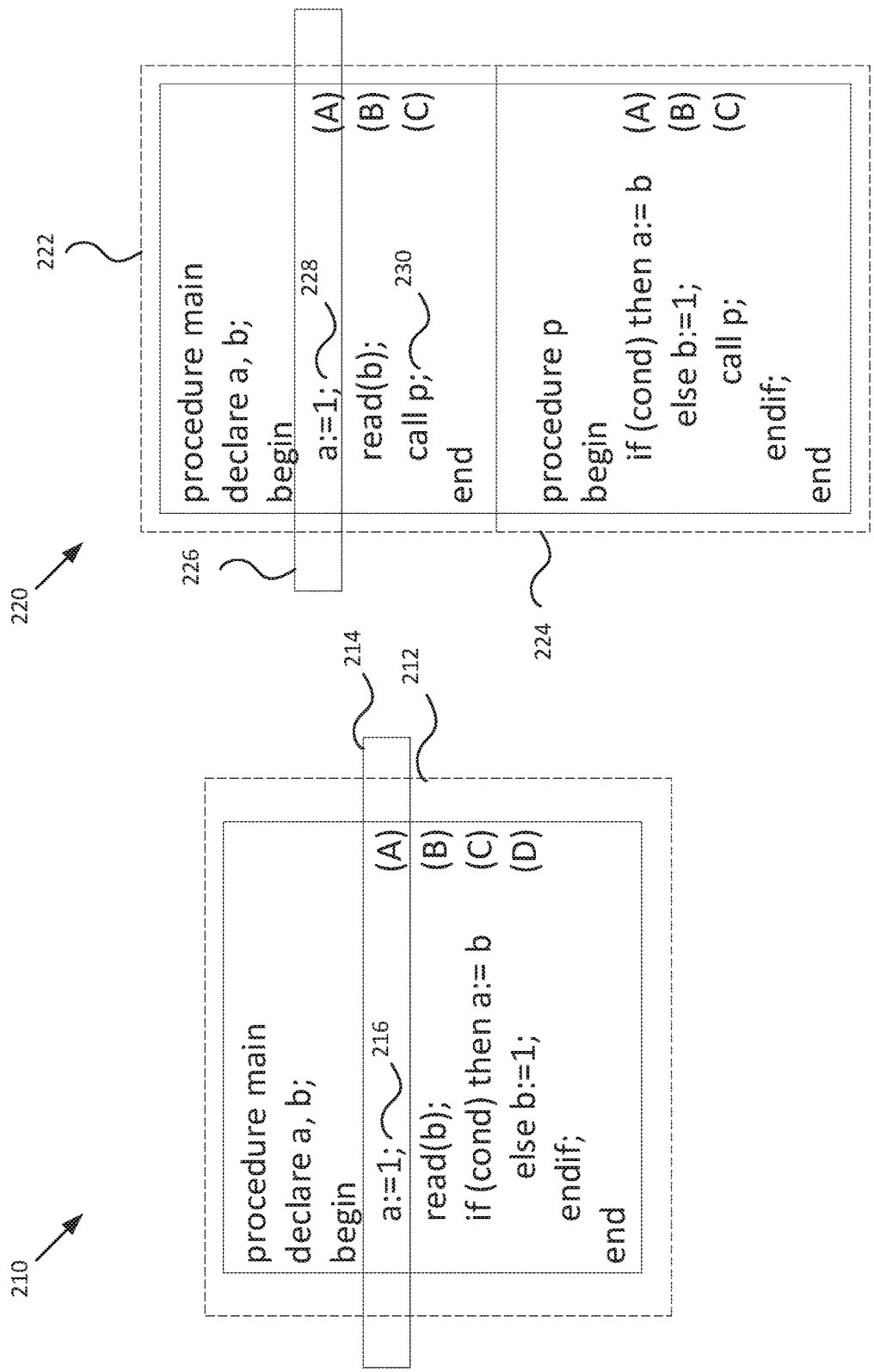
FIG. 2 illustrates an example first program source code and an example second program source code, in accordance with implementations of the present disclosure.

FIG. 2 illustrates an example first program source code 210 and an example second program source code 220, in accordance with implementations of the present disclosure. In some embodiments, first program source code 210 may be the same or similar to first source code module 106, as discussed with respect to FIG. 1. In some embodiments, second program source code 220 may be the same or similar to second source code module 108. In some embodiments, second program source code 220 may be a later version of first program source code 210, in accordance with previously described embodiments.

First program source code 210 may include at least a first code fragment 212. In some embodiments, first code fragment 212 may be identified by code section identifier 126, in accordance with previously described embodiments. First code fragment 212 may include a first procedure (i.e., procedure main). In some embodiments, the code included in the first procedure may be split into one or more code sections 214. Each code section 214 may include one or more program operations 216. Each program operation 216 of a code section 214 may be performed in the execution of the code section 214.

In some embodiments, second program source code 220 may include at least a first code fragment 222 and a second code fragment 224. In some embodiments, first code fragment 222 and second code fragment 224 may be identified by code section identifier 126. In some embodiments, first code fragment 222 may include a first procedure (i.e., procedure main) and second code fragment may include a second procedure (i.e., procedure p). Each procedure may be split into one or more code sections 226, where each code section 226 includes one or more program operations 228. Each program operation 228 of a code section 226 may be performed in the execution of the code section 226.

In some embodiments, first code fragment 222 may include a call to invoke a function 230. As discussed previously, a function may be a portion of a program source code that invokes the execution of another portion of the program source code. In some embodiments, function identifier 128 may identify an invocation of function 230 in first code fragment 222. As illustrated in FIG. 2, function 230 may invoke a call to perform procedure p, included in second code fragment 224.

As discussed previously, second program source code 220 may be a later version of first program source code 210. In such embodiments, a first code section of first code fragment 212 may correspond to a second code section of second code fragment 222. A first code section may correspond to a second code section if the first code section and the second code section include the same operation. For example, program operation A of a first code section 214 of first code fragment 212 may be the same as program operation A of a first code section 226 of first code fragment 222. As such, first code section 214 may correspond to first code section 226.

Figure 3A:
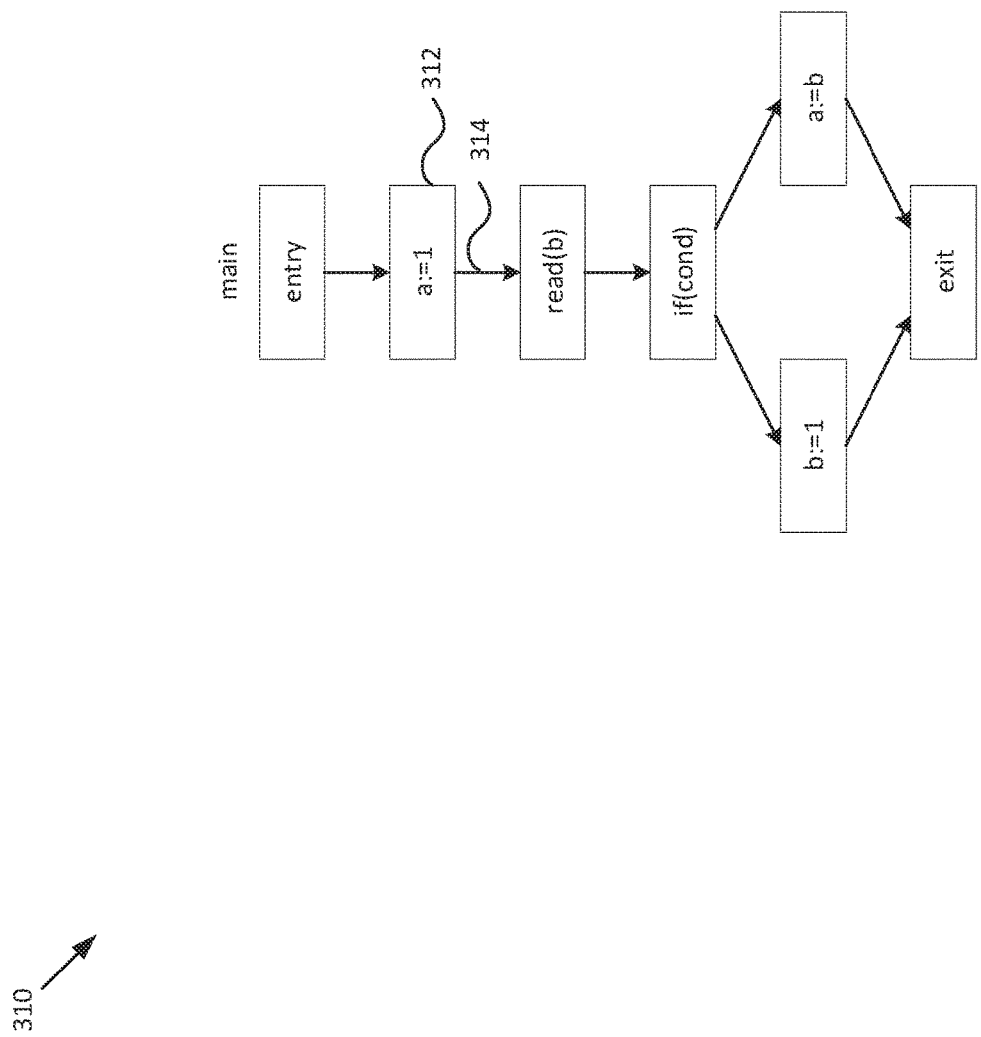
FIG. 3A illustrates an example control flow graph (CFG) that represents a first code fragment of the example first program source code of FIG. 2, in accordance with implementations of the present disclosure.

FIG. 3A illustrates an example first CFG 310 that represents a first code fragment 212 of the example first program source code 210 of FIG. 2, in accordance with implementations of the present disclosure. First CFG 310 may be a structural representation of first code fragment 212. In some embodiments, first CFG 310 may be generated by a compiler, as discussed with respect to FIG. 1. First CFG 310 may include one or more nodes where each node represents at least a section of first code fragment 212. For example, node 312 may represent a first code section 214 of code fragment 212. Each node may be connected to at least one other node by an edge 314, in accordance with previously described embodiments.

Figure 3B:
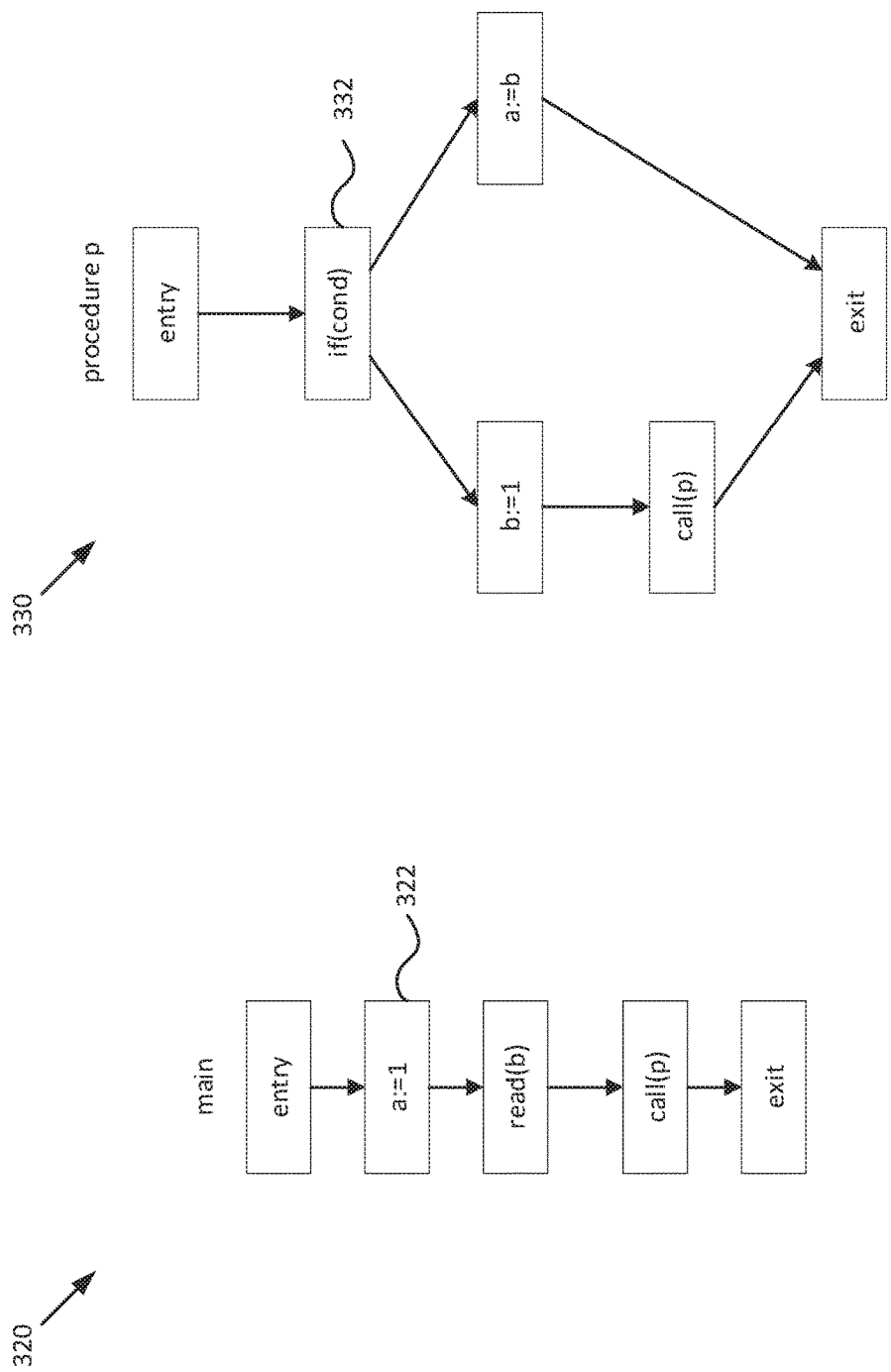
FIG. 3B illustrates an example first CFG that represents a first code fragment and an example second CFG that represents a second code fragment of second program source code of FIG. 2, in accordance with implementations of the present disclosure.

FIG. 3B illustrates an example first CFG 320 that represents a first code fragment 222 and an example second CFG 330 that represents a second code fragment 224 of second program source code 220 of FIG. 2, in accordance with implementations of the present disclosure. First CFG 320 may be a structural representation of first code fragment 222. Second CFG 330 may be a structural representation of second code fragment 224. In some embodiments, first CFG 310 may be generated by a compiler, as discussed with respect to FIG. 1. Both first CFG 320 and second CFG 330 may include one or more nodes where each node represents at least a section of first code fragment 222 and second code fragment 224, respectively. For example, node 322 may represent a first code section 226 of code fragment 222. In another example, node 332 may represent a second code section 226 of code fragment 224.

FIG. 4A illustrates a first CFG 410 and a second CFG 420 for syntactic comparison, in accordance with implementations of the present disclosure. In some embodiments, first CFG 410 may be the same as first CFG 310 of FIG. 3A. In similar embodiments, second CFG 420 may be the same as first CFG 320 of FIG. 3B. First CFG 410 may be a structural representation of at least a first code fragment of a first program source code corresponding to a first program. For example, first CFG 410 may be a structural representation of first code fragment 212 of first program source code 210. Second CFG 420 may be a structural representation of at least a second code fragment of a second program source code corresponding to a second program. For example, second CFG 420 may be a structural representation of first code fragment 222 of second program source code 220. In some embodiments, first CFG 410 and second CFG 420 may be generated by a compiler, as discussed with respect to FIG.

1. In other embodiments, first CFG 410 and second CFG 420 may be generated by CFG module 124 of equivalence manager 122, as discussed with respect to FIG. 1.

First CFG 410 and second CFG 420 may be used in determining a syntactic equivalence between a first program source code and a second program source code. The first program source code may be syntactically equivalent to the second program source code if the first program source code and the second program source code have the same structural form (i.e., the same or similar textual elements have a same or similar organization). A first set of sections of the first program source code and a second set of sections of the second program source code may be identified, where each of the first set of sections corresponds with a second section. The first set of sections and the second set of sections may be identified by code section identifier 126 of equivalence manager 122, as described with respect to FIG. 1. Code section identifier 126 may parse through the first code fragment to identify one or more first sections. Similarly, code section identifier 126 may parse through second code fragment to identify one or more second sections. Code section identifier 126 may compare each first section to each second section to determine whether each first section includes an operation that is the same as an operation included in a second section. In response to determining that an operation included in the first section is the same as an operation included in the second section, code section identifier may determine that the first section corresponds to the second section and include the first section and the second section in the first set of sections and the second set of sections, respectively.

In other or similar embodiments, a first section may include a call to a first function and a second section may include a call to a second function. Code section identifier 126 may determine that the first section corresponds to the second section in response to determining that the call to the first function is invoked at the same location (e.g., at the same line number) as the call to the section function. In some embodiments, another first section may be identified that may be subsequently invoked following an execution of the first section, that includes the call to the first function. Similarly, another second section may be identified that may be subsequently invoked following an execution of the second section. In such embodiments, code section identifier 126 may also determine that the subsequent first section corresponds to the subsequent second section.

In one example, as previously described, operation A of the first code section 214 of first code fragment 212 may be the same as operation A of the first code section 226 of second code fragment 222. As such, operation A of the first code section 214 may correspond to operation A of the first code section 226.

In response to identifying the first set of sections and the second set of corresponding sections, a syntactic equivalence between a first section of the first set of sections, represented by a first node 412 of CFG 410, and a corresponding second section of the second set of sections, represented by a second node 422 of CFG 420, may be determined. In some embodiments, it may be determined whether the first section is syntactically equivalent to the corresponding second section based on a determination of whether first node 412 is structurally equivalent to second node 422 (i.e., the first node 412 and the second node 422 are included at the same location in both first CFG 410 and second CFG 420). In other embodiments, a first call to a first function of the first section may be identified. In response to identifying the first function, a second call to a corresponding second function of the corresponding second section may be identified. The first function and the corresponding second function may be compared to determine whether the first function is syntactically equivalent to the corresponding second function. In some embodiments, the second function is determined to correspond to the first function by user-defined metadata indicating that the second function corresponds to the first function. For example, a developer of the first program source code and/or the second program source code may provide a definition (e.g., a parameter value) indicating that a first function of the first program source code corresponds to a second function of the second program source code. In other embodiments, it may be determined that the second function corresponds to the first function based on a first invocation (i.e., name) of the first function and a second invocation (i.e., name) of the second function. For example, the first function with the function name of "function A" may correspond to the second function with the function name of "function A." By determining whether the first function corresponds to the second function based on the invocation of each function, a definition for each function may not be analyzed in order to determine whether the first function is syntactically equivalent to the second function.

In response to determining that the corresponding second section does not include a call to a corresponding second function, it may be determined that the first section is not syntactically equivalent to the corresponding section, even though there may be a structural equivalence between the first node 414 and the second node 424. For example, it may be determined that the first node 414 includes a call to a first function and the second node 424 does not include a call to a corresponding second function. As such, it may be determined that the first section is not syntactically equivalent to the corresponding second section.

In some embodiments, responsive to determining that the corresponding second section includes a call to a corresponding second function, it may be determined whether the location in the source code file for the first source code where the first function is invoked is the same as the location in the source code file for the second source code where the corresponding section function is invoked. The location of the first function may be determined based on a location identifier associated with first node 412 including the first function. The location identifier may indicate a location in the source code file including the invocation of the first function (i.e., a line number, etc.). A first location of the first function and a second location of the second function may be identified. In some embodiments, the first location identifier and the second location identifier may be compared to determine whether the call of the first function is invoked at the same location of the first source code file as the corresponding second function of the second source code file.

In response to determining that the first location identifier is equivalent to the second location identifier, it may be determined whether a first set of parameter values associated with the first function and a second set of parameter values associated with the corresponding second function are the same and/or similar. Each parameter value of the first set of parameter values may be compared with a corresponding parameter value of the second set of parameter values to determine whether the first set of parameter values and the second set of parameter values are the equivalent. In response to determining that the first set of parameter values is the same or similar to the second set of parameter values, it may be determined that the first function is syntactically equivalent to the second function.

In some embodiments, in response to determining that the corresponding second section of the second code fragment includes a call to a corresponding second function, a code fragment may be identified that defines the first function. Further detail regarding the identification of the third code fragment is further discussed with respect to FIG. 4B.

FIG. 4B further illustrates a third CFG 430 and a fourth CFG 440 representing a third code fragment and a fourth code fragment respectively, in accordance with implementations of the present disclosure. As discussed previously, in response to determining that the corresponding second section of the second code fragment includes a call to a corresponding second function, a third code fragment may be identified that includes a definition of the first function. In response to identifying the third code fragment, a corresponding fourth code fragment may be identified, where the corresponding fourth code fragment includes a definition of the corresponding second function. Third CFG 430 may be a structural representation of the third code fragment and fourth CFG 440 may be a structural representation of the corresponding fourth code fragment.

In response to identifying the third code fragment and the corresponding fourth code fragment, a first portion of the third code fragment may be identified and a corresponding second portion of the corresponding fourth code fragment may be identified. A first portion of the third code fragment may be represented by a first node 432 and a second portion of the fourth code fragment may be represented by a second node 442. In some embodiments, it may be determined whether the first portion is syntactically equivalent to the corresponding second portion, in accordance with previously described embodiments. In response to determining that the first portion is syntactically equivalent to the corresponding second portion, it may be determined that the first function is syntactically equivalent to the corresponding second function. As such, it may be determined that the first section is syntactically equivalent to the corresponding second section. In response to determining that the first portion is not syntactically equivalent to the corresponding second portion, it may be determined that the first function is not syntactically equivalent to the corresponding second function and therefore, the first section is not syntactically equivalent to the corresponding second section.

Referring now to FIG. 4A, in some embodiments, a first subset of sections of the first set of sections may be identified that include one or more first sections that are not syntactically equivalent to a corresponding second subset of sections of the corresponding second set of sections. The first subset of sections and the second subset of sections may be analyzed to detect a semantic equivalence between a first subsection of the first subset of sections and a corresponding second subsection of the second subset of sections.

As discussed previously, a first section may be determined to be syntactically equivalent to a corresponding second section based on a determination of whether first node 412 is structurally equivalent to second node 422. In some embodiments, a dependence relation may be detected between a first operation included in the first section and a second operation included in a section of the first code fragment. The dependence relation may be detected by dependence relation detector 136, described with respect to FIG. 1. In some embodiments, the first operation and the second operation may be included in the first section of the first code fragment. In other embodiments, the first operation may be included in a first section of the first code fragment and the second operation may be included in a another section of the first code fragment. In response to determining that the dependence relation exists between the first operation and the second operation, the first section may be included in the first subset of sections, even though the first section may be syntactically equivalent to a corresponding second section of the second code fragment.

With respect to first CFG 410 and second CFG 410, a first subset of nodes 412 may be identified that represent the first subset of sections. Similarly, a second subset of nodes 422 may be identified that represent the corresponding second subset of sections. In some embodiments, a first reduced CFG and a second reduced CFG may be CFGs that only include nodes from the first subset of nodes 412 and the second subset of nodes 422, respectively. The first reduced CFG and the second reduced CFG may be used in determining a semantic equivalence between each first subsection of the first subset of sections and a corresponding second subsection of the second subset of sections. Further details regarding the first reduced CFG and the second reduced CFG are provided with respect to FIG. 4C.

FIG. 4C illustrates a first reduced CFG 450 and a second reduced CFG 460, in accordance with implementations of the present disclosure. In some embodiments, first reduced CFG 450 and second reduced CFG 460 may be generated by a compiler program executed at a compile time of the first program and/or the second program, as discussed with respect to FIG. 1. In other embodiments, first reduced CFG 450 and second reduced CFG 460 may be generated by CFG module 124 of equivalence manager 122, as discussed with respect to FIG. 1.

As discussed previously, the first reduced CFG 450 may be a CFG where each node 452 is determined to not be syntactically equivalent to a corresponding node 462 of the second reduced CFG 460. In response to generating first reduced CFG 450 and second reduced CFG 460, it may be determined whether each node 452 of first reduced CFG 450 is semantically equivalent to a corresponding node 462 of second reduced CFG 460. In some embodiments, it may be determined whether first node 452 is semantically equivalent to corresponding node 462 by comparing a first data type of first node 452 and a second data type of corresponding node 462. As discussed previously, a data type may be associated with one or more fields, wherein each field is associated with a field label and a field data type. Each field may be translated to a memory address indicating a portion of memory where data associated with the data type is stored. Based on the memory address, data associated with the data type may be directly accessed at the memory. The memory address may include an indication of the portion of memory where the data is stored and a memory offset that indicates a location of the portion of memory where the data may be found. In some embodiments, the first data type of the first section represented by first node 452, and the second data type of the second section represented by second node 462 may be a user-defined data type.

In some embodiments, it may be determined whether a first data type associated with the first node 312 is semantically equivalent to a second data type associated with the corresponding second node 322. A first field label of the first data type and a second field label of the second data type may be identified. A first memory offset to be generated for the first field and a second memory offset to be generated for the second field may be determined.

A semantic equivalence many be determined between the first section and the corresponding second section by comparing the first field label to the second field label, and the first memory offset to the second memory offset. The first field label may be compared with the second field label, and the first memory offset may be compared with the second memory offset, such to determine whether the first field label is the same as the second field label, and the first memory offset is the same as the second memory offset. In some embodiments, it may be determined that the first field label is the same as the second field label and the first memory offset is the same as the second memory offset. In such embodiments, it may be determined that the first data type is semantically equivalent to the second data type, and therefore the first section is semantically equivalent to the second section. In other embodiments, it may be determined that the first field label is not to the same as the second field label and the first memory offset is not the same as the second memory offset. In such embodiments, it may be determined that the first data type is not semantically equivalent to the second data type and, as such, the first section is not semantically equivalent to the second section.

In some embodiments, it may be determined that the first field label is the same as the second label and the first memory offset is not the same as the second memory offset. In such embodiments, it may be determined that the first data is semantically equivalent to the second data type and, as such the first is semantically equivalent to the second section. In other embodiments, it may be determined that the first field label is not the same as the second field label and the first memory offset is the same as the second memory offset. In such embodiments, it may be further determined whether a different data type field is accessed in executing the second program source code by determining whether the different data type field is included as a field of the first data type. In response to determining that the different data type field is included as a field of the first data type, it may be determined that the first data type and the second data type are semantically equivalent, and therefore the first section is semantically equivalent to the second section. In response to determining that the different data type field is not included as a field of the first data type, it may be determined that the first data type is not semantically equivalent to the second data type, and therefore the first section is not semantically equivalent to the second section.

In some embodiments, it may be determined whether the first section is semantically equivalent to the second section based on an amount of space of a memory component, such as memory 102 of FIG. 1, that is occupied by data having the first data type and data having the second data type. In response to determining that the first data type occupies the same amount of space at the memory component that is occupied by the second data type, it may be determined that the first data type is equivalent to the second data type. In response to determining that the first data type does not occupy the same amount of space at the memory component that is occupied by the second data type, a difference between a first amount of space occupied by the first data type and a second amount of space occupied by the second data type may be determined. In response to determining that the difference exceeds a difference threshold, it may be determined that the first data type is equivalent to the second data type, and therefore the first section is semantically equivalent to the corresponding second section.

In embodiments, it may be determined whether the first section represented by the first node 452 of the first reduced CFG 450 is semantically equivalent to the corresponding second section, represented by the second node 462 of second reduced CFG 320 based on an invocation of a call to a first function in the first section. Further details regarding this embodiments are provided with respect to FIG. 4D.

Figure 4D:
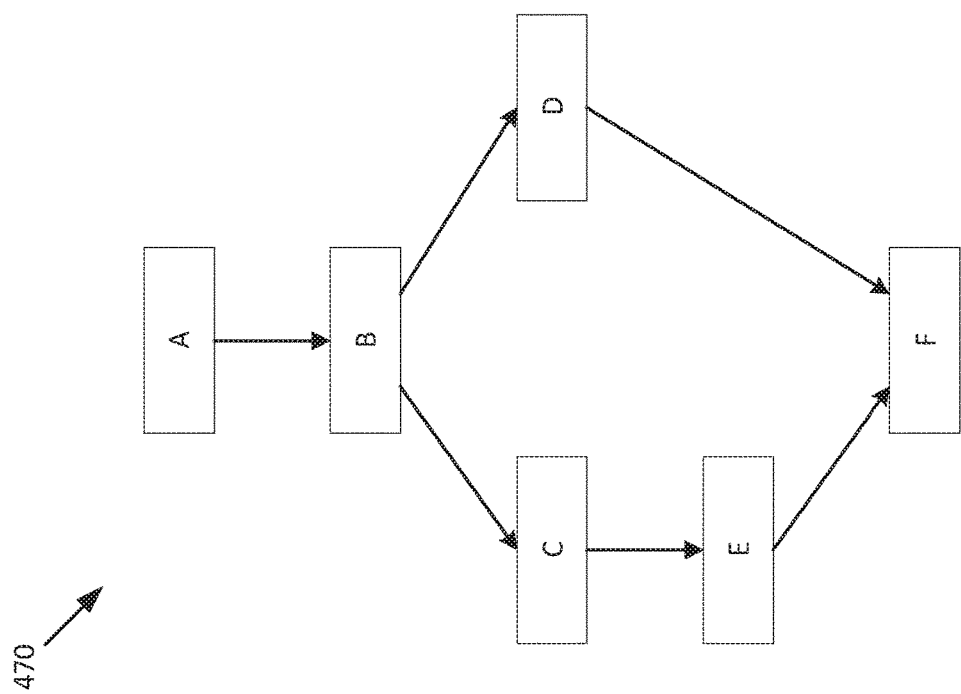
FIG. 4D illustrates a third reduced CFG representing a third code fragment, in accordance with implementations of the present disclosure.

FIG. 4D illustrates a third reduced CFG 470 representing a third code fragment, in accordance with implementations of the present disclosure. As discussed above, a first section of a first code fragment may include a call I to a first function. In some embodiments, a second section of a second code fragment may not include a call to a corresponding second function. In such embodiments, a third code fragment of the first program source code may be identified where the third code fragment includes a first definition of the first function. A structure of the third code fragment is represented by third reduced CFG 470. A third set of sections of the third code fragment may be identified where each section of the third set of sections corresponds to a second section of the second set of sections described with respect to FIGS. 4A-4C. Each of the third set of sections may be identified in accordance with previously described embodiments. In one example, a third section, represented by node 472 of CFG 470, may correspond to a second section, represented by node 462 of CFG 460, described with respect to FIG. 4C.

In some embodiments, it may be determined whether each third section of the third set of sections is syntactically equivalent to the corresponding second section of the second set of sections. A syntactic equivalence may be determined in accordance with one or more previously described embodiments. Referring now to FIG. 4C, in response to determining that the third section is syntactically equivalent to the corresponding second section, it may be determined that the first section is semantically equivalent to the corresponding second section, and therefore first node 452 is semantically equivalent to second node 462. In other embodiments, in response to determining that the third section is not syntactically equivalent to the corresponding second section, it may be determined that the first section is not semantically equivalent to the corresponding second section, and therefore first node 452 is not semantically equivalent to second node 462.

In some embodiments, a first subset of sections may be identified that include one or more first sections that are not semantically equivalent to a corresponding section subset of sections of the second code fragment. With respect to first reduced CFG 450 and second CFG 460, a first subset of nodes 452 may be identified that represent the first subset of sections. Similarly, a second subset of nodes 462 may be identified that represent the corresponding second subset of sections. In some embodiments, another first reduced CFG and another second reduced CFG may be generated such to include only nodes from the first subset of nodes 452 and the second subset of nodes 462, respectively. Further details regarding the first reduced CFG and the second reduced CFG are provided with respect to FIG. 4E.

FIG. 4E illustrates a first reduced CFG 480 and a second reduced CFG 490, in accordance with implementations of the present disclosure. In some embodiments, first reduced CFG 480 and second reduced CFG 490 may be generated by a compiler program executed at a compile time of the first program and/or the second program, as discussed with respect to FIG. 1. In other embodiments, first reduced CFG 480 and second reduced CFG 490 may be generated by CFG module 124 of equivalence manager 122, as discussed with respect to FIG. 1.

As discussed previously, first reduced CFG 480 may be a CFG where each node 482 is determined to not be semantically equivalent to a corresponding node 492 of the second reduced CFG 490. Each node 482 may represent a first section of a first code fragment where the first section is not semantically equivalent to a corresponding second section of a second code fragment, represented by nodes 492.

In some embodiments, a user of a processing device may be provided with an indication, based on the first sections represented by nodes 482 and the second sections represented by nodes 492, of whether the first program source code is semantically equivalent to the second program source code. In other embodiments, a user may also be provided with an indication of a location of the first program source code file and the second program source code file where the semantically different program source code is located. In some embodiments, nodes 482 and 492 may be associated with a location identifier indicating a location of a first program source code file and a second program source code file where the associated program source code is located. In such embodiments, the location identifier associated with nodes 482 and 492 may be provided to a user, therefore indicating a location of the first program source code file and the second program source code file where the semantically different program source code is located. In other or similar embodiments, the one or more portions of the first program source code and the second program source code may be used in further semantic analysis.

Figure 5:
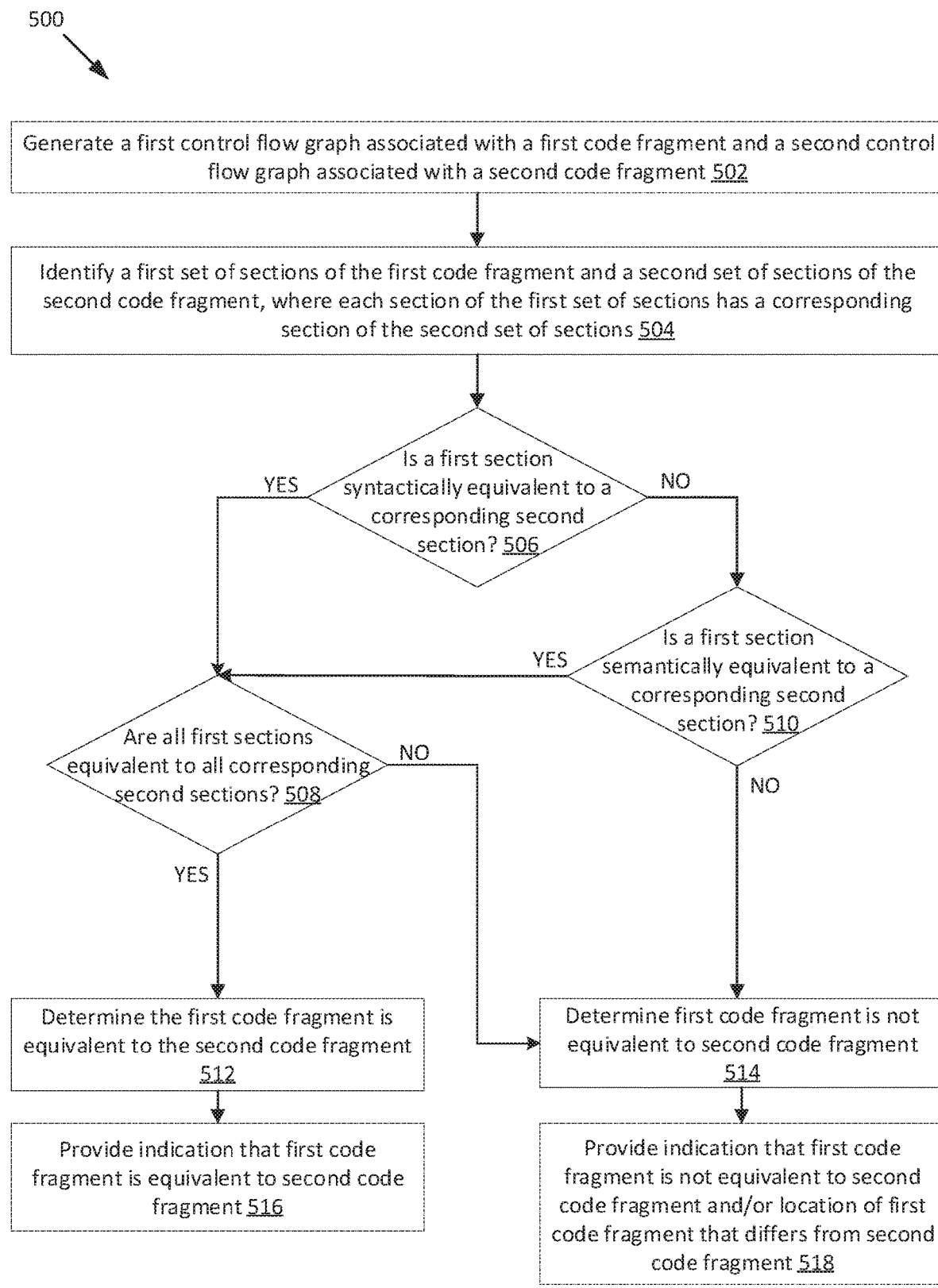
FIG. 5 is a flow diagram of a method for determining whether a first program source code is semantically equivalent to a second program source code, in accordance with implementations of the present disclosure.

FIG. 5 is a flow diagram of a method 500 of determining whether a first program source code is semantically equivalent to a second program source code, in accordance with implementations of the present disclosure. In one implementation, method 500 may be performed by the equivalence manager 122 as described with respect to FIG. 1. The method 500 may be performed by processing logic that may comprise hardware (circuitry, dedicated logic, etc.), software (e.g., software executed by a general purpose computer system or a dedicated machine), or a combination of both. It should be noted that blocks depicted in FIG. 5 can be performed simultaneously or in a different order than that depicted.

Referring to FIG. 5, method 500 begins at block 502 where, optionally, a first CFG associated with a first code fragment of a first program source code, and a second CFG associated with a second code fragment of a second program source code may be generated. At block 504, a first set of sections of the first code fragment and a second set of sections of the second code fragment may be identified, where each section of the first set of sections has a corresponding section of the section set of sections. At block 506, it may be determined whether a first section of the first set of sections is syntactically equivalent to a corresponding second section of the second set of sections. Responsive to determining that a first section is syntactically equivalent to a corresponding second section, method 500 may continue to block 508. Responsive to determining that a first section is not syntactically equivalent to a corresponding second section, method 500 may continue to block 510. Further details regarding determining syntactic equivalence between a first section and a corresponding second section are provided with respect to FIG. 6. At block 508, it may be determined whether all first sections are equivalent to all corresponding second sections. A first section is determined to be equivalent to a corresponding second section if the first section is syntactically and semantically equivalent to the second section. Responsive to determining that all first sections are equivalent to all corresponding second sections, method 500 may continue to block 512. Responsive to determining that not all first sections are equivalent to all corresponding second sections, method 500 may continue to block 514. Referring now to block 510, it may be determined whether a first section is semantically equivalent to a corresponding second section. Further details regarding determining semantic equivalence between a first section and a corresponding second section are provided with respect to FIGS. 7A and 7B. Responsive to determining that the first section is not semantically equivalent to a corresponding second section, method 500 may continue to block 508. Responsive to determining that the first section is not semantically equivalent to a corresponding second section, method 500 may continue to block 514. Referring now to block 512, responsive to determining that all first sections are equivalent to all corresponding second sections, it may be determined that the first code fragment is equivalent to the second code fragment. At block 512, optionally, an indication may be provided indicating that the first code fragment is equivalent to the second code fragment. Referring now to block 514, responsive to determining that a first section is not semantically equivalent to a corresponding second section, or determining that all first sections are not equivalent to all corresponding second sections, it may be determined that the first code fragment is not equivalent to the second code fragment. At block 518, an indication may be provided indicating that the first code fragment is not equivalent to the second code fragment. Additionally, a location identifier may be provide indicating a location of the first code fragment that differs from the second code fragment.

Figure 6:
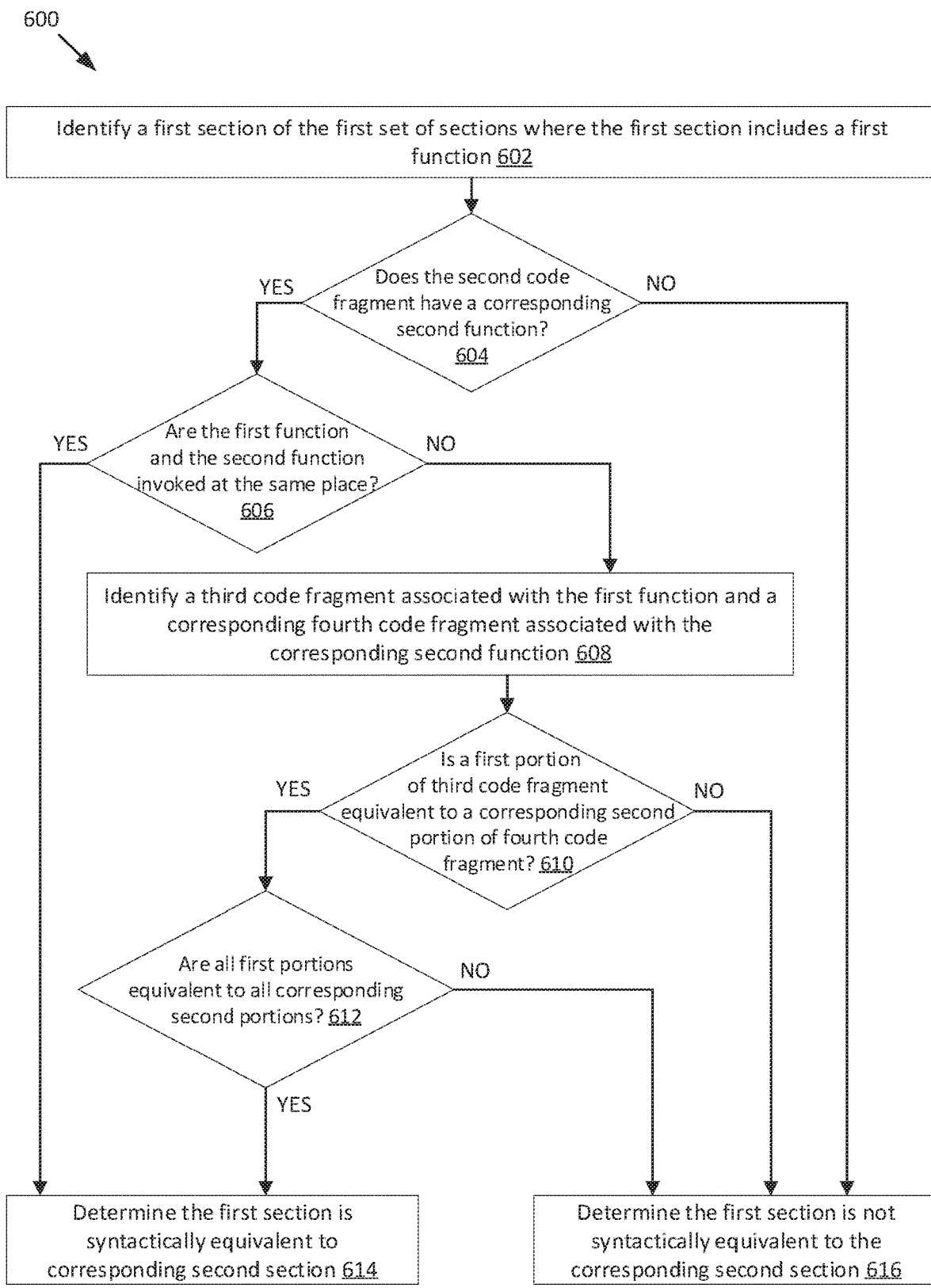
FIG. 6 is a flow diagram of a method for determining whether a first section of a first code fragment is syntactically equivalent to a corresponding second section of a second code fragment, in accordance with implementations of the present disclosure.

FIG. 6 is a flow diagram of a method 600 of determining whether a first section of a first code fragment is syntactically equivalent to a corresponding second section of a second code fragment, in accordance with implementations of the present disclosure. In one implementation, method 600 may be performed by the equivalence manager 122 as described with respect to FIG. 1. The method 600 may be performed by processing logic that may comprise hardware (circuitry, dedicated logic, etc.), software (e.g., software executed by a general purpose computer system or a dedicated machine), or a combination of both. It should be noted that blocks depicted in FIG. 6 can be performed simultaneously or in a different order than that depicted.

At block 602, a first section of the first set of sections may be identified, where the first section includes a first function. At block 604, it may be determined whether the second code fragment has a corresponding second function. Responsive to determining that the second code fragment has a corresponding second function, method 600 may continue to block 606. Responsive to determining that the second code fragment does not have a corresponding second function, method 600 may continue to block 616. At block 606, it may be determined whether the first function and the second function are invoked at the same place in the first code fragment and the second code fragment, respectively. Responsive to determining that the first function and the second function are invoked at the same place, method 600 may continue to block 614. Responsive to determining that the first function and the second function are not invoked at the same place, method 600 may continue to block 608. At block 608, a third code fragment associated with the first function, and a corresponding fourth code fragment associated with the corresponding second function may be identified. At block 610, it may be determined whether a first portion of the third code fragment is equivalent to a corresponding second portion of the corresponding fourth code fragment. Responsive to determining that the first portion is equivalent to a corresponding second portion, method 600 may continue to block 612. Responsive to determining that the first portion is not equivalent to the corresponding second portion, method 600 may continue to block 616. At block 612, responsive to determining that the first portion is equivalent to the corresponding second portion, it may be determined whether all first portions are equivalent to all corresponding second portions. Responsive to determining that all first portions are equivalent to all corresponding second portions, method 600 may continue to block 614. Responsive to determining that not all first portions are equivalent to all corresponding second portions, method 600 may continue to block 616. At block 614, responsive to determining that all first portions are equivalent to all corresponding second portions, or determining that the first function and the second function are invoked at the same place, it may be determined that the first section is syntactically equivalent to the corresponding second section. At block 616, it may be determined that the first section is not syntactically equivalent to the corresponding second section.

Figure 7A:
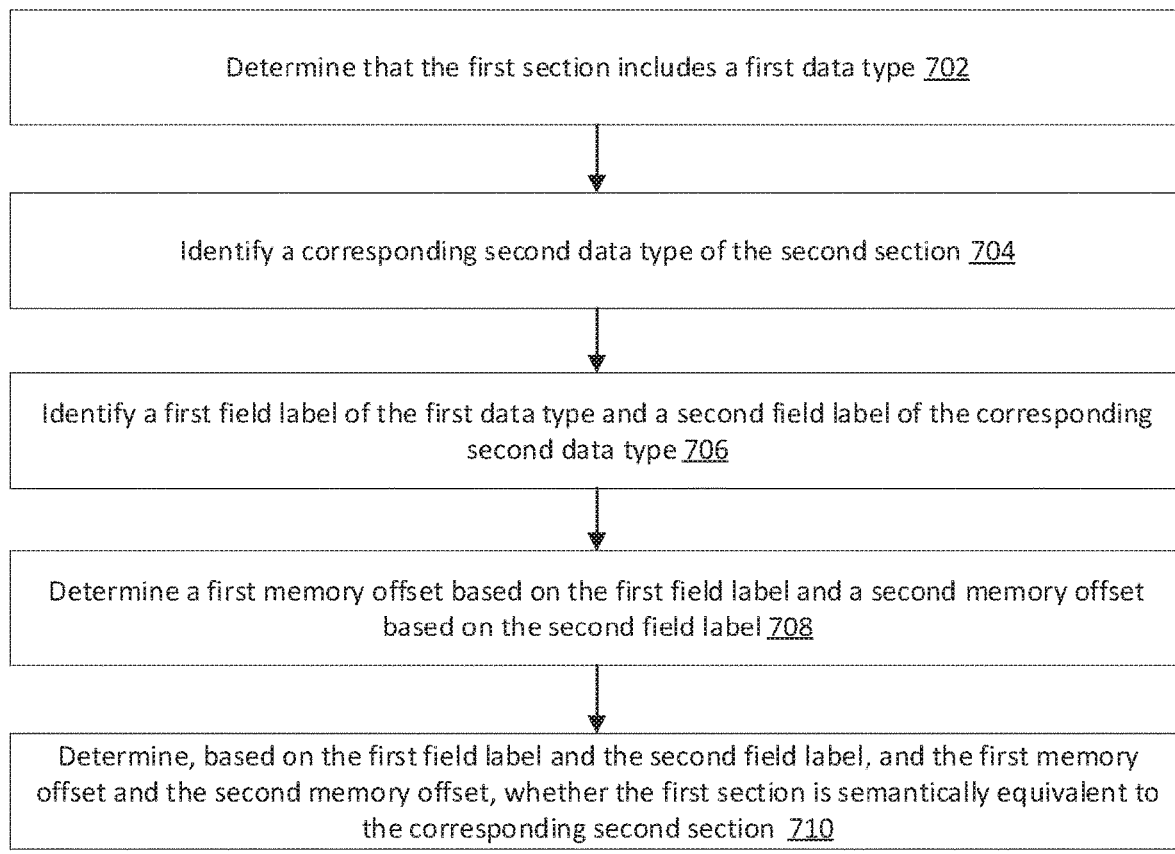
FIG. 7A is a flow diagram of a method for determining whether a first section of a first code fragment is semantically equivalent to a corresponding second section of a second code fragment, in accordance with implementations of the present disclosure.

FIG. 7A is a flow diagram of a method 700 of determining whether a first section of a first code fragment is semantically equivalent to a corresponding second section of a second code fragment, in accordance with implementations of the present disclosure. In one implementation, method 700 may be performed by the equivalence manager 122 as described with respect to FIG. 1. The method 700 may be performed by processing logic that may comprise hardware (circuitry, dedicated logic, etc.), software (e.g., software executed by a general purpose computer system or a dedicated machine), or a combination of both. It should be noted that blocks depicted in FIG. 7A can be performed simultaneously or in a different order than that depicted.

At block 702, it may be determined that the first section includes a first data type. At block 704, a corresponding second data type of the second section may be identified. At block 706, a first label of the first data type and a second label of the corresponding second data type may be identified. At block 708, a first memory offset may be determined based on the first label and a second memory offset may be determined based on the second label. At block 710, it may be determined, based on the first label and the second label, and the first memory offset and the second memory offset, whether the first section is semantically equivalent to the corresponding second section.

FIG. 7B is a flow diagram of another method 750 of determining whether a first section of a first code fragment is semantically equivalent to a corresponding second section of a second code fragment, in accordance with implementations of the present disclosure. In one implementation, method 750 may be performed by the equivalence manager 122 as described with respect to FIG. 1. The method 750 may be performed by processing logic that may comprise hardware (circuitry, dedicated logic, etc.), software (e.g., software executed by a general purpose computer system or a dedicated machine), or a combination of both. It should be noted that blocks depicted in FIG. 7B can be performed simultaneously or in a different order than that depicted.

At block 752, a first section of the code fragment that includes a first function, and a second section of the code fragment that does not include a corresponding second function may be identified. At block 754, a third set of sections from a third code fragment may be identified where each section of the third set of sections has a corresponding second section. At block 756, it may be determined whether the third section is syntactically equivalent to a second corresponding section. Responsive to determining that the third section is syntactically equivalent to the second corresponding section, method 750 may continue to block 758. Responsive to determining that the third section is not syntactically equivalent to the second corresponding second section, method 750 may continue to block 762. At block 758, it may be determined whether all third sections are syntactically equivalent to all corresponding second sections. Responsive to determining that all third sections are syntactically equivalent to all corresponding second sections, method 750 may continue to block 760. Responsive to determining that not all third sections are syntactically equivalent to all corresponding second sections, method 750 may continue to block 762. At block 760, it may be determined that the first section is semantically equivalent to the second section. At block 762, it may be determined that the first section is not semantically equivalent to the second section.

Figure 8:
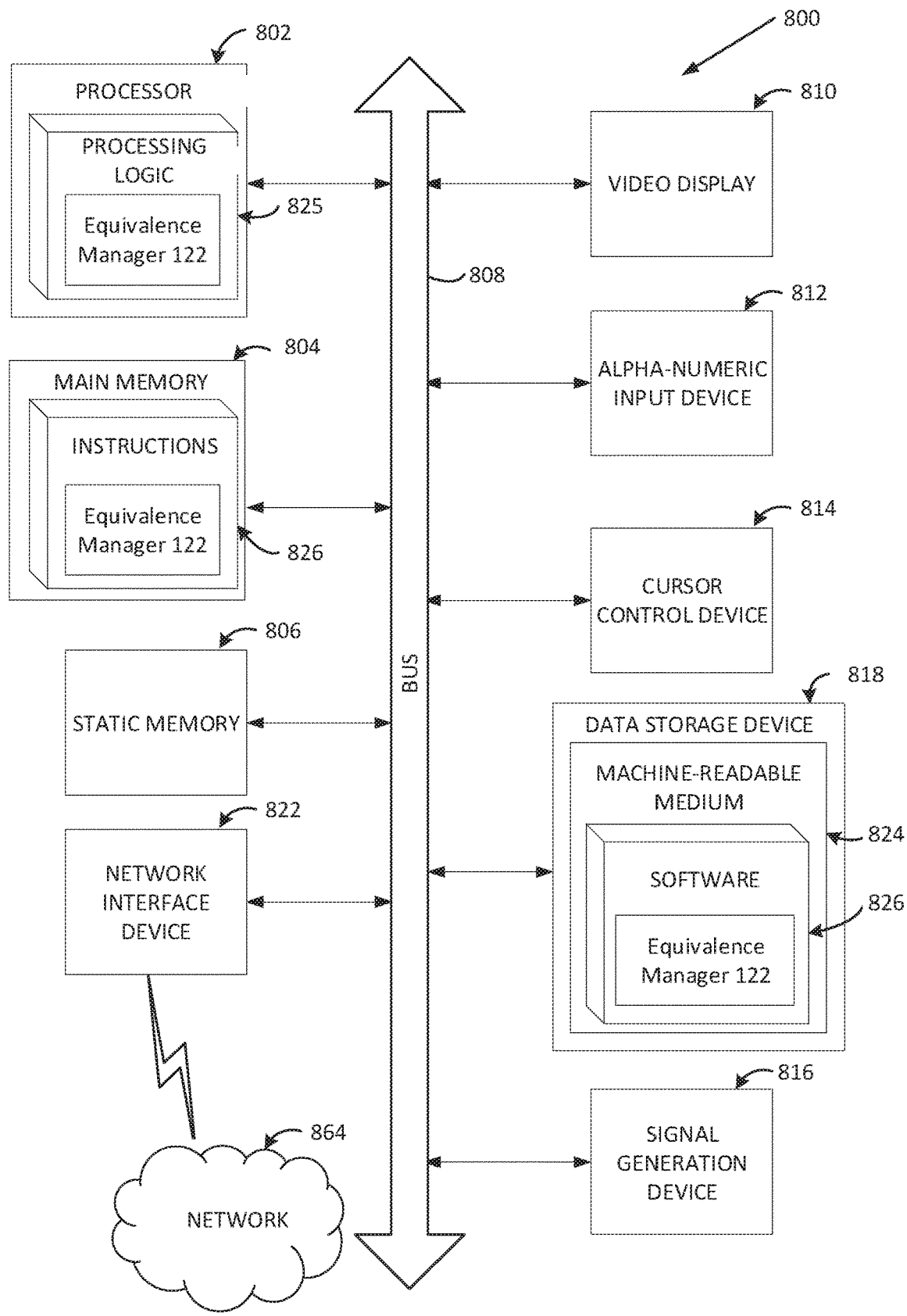
FIG. 8 is a block diagram illustrating a computer system in which implementations of the disclosure may be used.

FIG. 8 is a block diagram illustrating a computer system 800 in which implementations of the disclosure may be used. In some implementations, the computer system 800 may support detecting a semantic equivalence between a first program source code and a second program source code.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting manifest list for multi-platform application container images.

The computer system 800 includes a processing device 802, a main memory 804 (e.g., read-only memory (ROM), flash memory, dynamic random access memory (DRAM) (such as synchronous DRAM (SDRAM) or DRAM (RDRAM), etc.), a static memory 806 (e.g., flash memory, static random access memory (SRAM), etc.), and a data storage device 818, which communicate with each other via a bus 808.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is to execute the instructions 826 for performing the operations and steps discussed herein.

The computer system 800 may further include a network interface device 822 communicably coupled to a network 825. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

Instructions 826 may reside, completely or partially, within volatile memory 804 and/or within processing device 802 during execution thereof by computer system 800, hence, volatile memory 804 and processing device 802 may also constitute machine-readable storage medium 824. The instructions 826 may also implement the equivalence manager 122 to support detecting a semantic equivalence between one or more program source codes.

Data storage device 818 may include a computer-readable storage medium 824 (e.g., a non-transitory computer-readable storage medium) on which may store instructions 826 encoding any one or more of the methods or functions described herein, including instructions for implementing method 500 of FIG. 5, method 600 of FIG. 6, method 650 of FIG. 6B, method 700 of FIG. 7A, or method 750 of FIG. 7B.

The non-transitory machine-readable storage medium 824 may also be used to store instructions 826 to support detecting a semantic equivalence between one or more program source codes described herein, and/or a software library containing methods that call the above applications. While the machine-accessible storage medium 824 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

It is to be understood that the above description is intended to be illustrative, and not restrictive. Many other implementations are apparent upon reading and understanding the above description. The scope of the disclosure should, therefore, be determined with reference to the appended claims, along with the full scope of equivalents to which such claims are entitled.

In the above description, numerous details are set forth. It is apparent, however, that the disclosure may be practiced without these specific details. In some instances, structures and devices are shown in block diagram form, rather than in detail, in order to avoid obscuring the disclosure.

Other computer system designs and configurations may also be suitable to implement the systems and methods described herein. The following examples illustrate various implementations in accordance with one or more aspects of the present disclosure.

Example 1 is a method comprising: identifying, in view of a first control flow graph associated with a first code fragment and a second control flow graph associated with a second code fragment, a first set of sections of the first code fragment and a second set of sections of the second code fragment, such that each section of the first set of sections has a corresponding section of the second set of sections; identifying a first section of the first set of sections, wherein the first section is not syntactically equivalent to a corresponding second section of the second set of sections; and responsive to determining that the first section is not syntactically equivalent to the corresponding second section, finding that the first code fragment is not semantically equivalent to the second code fragment.

Example 2 is the method of example 1, wherein identifying the first section comprises: responsive to determining that the first section comprises a call to a first function and that the corresponding second section comprises a call to a corresponding second function, identifying a third code fragment associated with a definition of the first function and a corresponding fourth code fragment associated with a definition of the corresponding second function; and identifying a first portion of the third code fragment, wherein the first portion is not syntactically equivalent to a corresponding second portion of the corresponding fourth code fragment.

Example 3 is the method of example 1, further comprising: responsive to determining that the first section comprises a first function and that the corresponding second section does not comprise a corresponding second function, determining that the first section is not syntactically equivalent to the corresponding second section.

Example 4 is the method of example 1, further comprising: responsive to determining that the first section is syntactically equivalent to the corresponding second section: determining whether there is a dependence relation between a first operation of the first section and a second operation of the first section; and in response to determining there is a dependence relation between the first operation and the second operation, performing semantic comparison between the first section and the corresponding second section.

Example 5 is the method of example 1, wherein finding that the first code fragment is not semantically equivalent to the second code fragment comprises: responsive to determining that the first data type does not correspond to the second data type, finding that the first section is not semantically equivalent to the corresponding second section.

Example 6 is the method of example 5, wherein determining whether the first data type corresponds to the second data type comprises: determining a first memory offset, based on a first label of the first data type, that is to be assigned to the first label and a second memory offset, based on a second label of the second data type, that is to be assigned to the second label; and responsive to determining that the first label does not correspond to the second label and the first memory offset does not correspond to the second memory offset, finding that the first data type is not semantically equivalent to the second data type.

Example 7 is the method of example 6, further comprising: responsive to determining that the first label does not correspond to the second label and the first memory offset corresponds to the second memory offset, determining whether a first field associated with the first label corresponds to a second field associated with the second label; and responsive to determining that the first field does not correspond to the second field, finding that the first data type is not semantically equivalent to the second data type.

Example 8 is a method of example 5, wherein determining whether the first data type corresponds to the second data type further comprises: responsive to determining that the first data type occupies a larger amount of space at a first memory component than an amount of space occupied by the second data type at a second memory component, finding that the first data type is not semantically equivalent to the second data type.

Example 9 is the method of example 1, further comprising: providing, to a user of a processing device, at least one of: an indication that the first code fragment is not semantically equivalent to the second code fragment, or a location identifier associated with the first section, wherein the location identifier indicates a first location of the first code fragment that is not semantically equivalent to a second location of the second code fragment.

Example 10 is a system, comprising: a memory; a processing device coupled to the memory, the processing device to: identify, in view of a first control flow graph associated with a first code fragment and a second control flow graph associated with a second code fragment, a first set of sections of the first code fragment and a second set of sections of the second code fragment, such that each section of the first set of sections has a corresponding section of the second set of sections; identify a first section of the first set of sections, wherein the first section comprises a call to a first function and wherein a corresponding second section of the second set of sections does not comprise a call to a corresponding second function; and responsive to determining that the first section is not syntactically equivalent to the corresponding second section, find that the first code fragment is not semantically equivalent to the second code fragment.

Example 11 is the system of example 10, wherein to find that the first code fragment is not semantically equivalent to the second code fragment, the processing device is to: identify a third set of sections from a third code fragment associated with a definition of the first function, wherein each section of the third set of sections has a second corresponding second section of the second set of sections; identify a third section of the third set of sections, wherein the third section is not syntactically equivalent to a second corresponding second section of the second set of sections; and responsive to determining that the third section is not syntactically equivalent to the second corresponding second section, find that the first section is not semantically equivalent to the corresponding second section.

Example 12 is the system of example 10, wherein to identify the third section of the third set of sections, the processing device is to: responsive to determining that the third section comprises a call to a second function and that the second corresponding second section comprises a call to a corresponding third function, identify a fourth code fragment of the first control flow graph associated with a definition of the second function and a corresponding fifth code fragment of the second control flow graph associated with a definition of the corresponding third function; and identify a first portion of the fourth code fragment, wherein the first portion is not syntactically equivalent to a corresponding second portion of the corresponding fifth code fragment.

Example 13 is the system of example 10, wherein the processing device is further to: responsive to determining that the third section comprises the call to the second function and that the second corresponding second section does not comprise the call to the corresponding third function, determining that the third section is not syntactically equivalent to the second corresponding second section.

Example 14 is the system of example 10, wherein the processing device is further to: responsive to determining that the third section is syntactically equivalent to the corresponding second section: determine whether there is a dependence relation between a first operation associated with a definition of first function and a second operation associated with the definition of the first function; and in response to determining there is a dependence relation between the first operation and the second operation, perform semantic comparison between the first section and the corresponding second section.

Example 15 is the system of example 10, wherein the process device is to: provide, to a user of the processing device, at least one of: an indication that the first code fragment is not semantically equivalent to the second code fragment, or a location identifier associated with the first section, wherein the location identifier indicates a first location of the first code fragment that is not semantically equivalent to a second location of the second code fragment.

Example 16 is a non-transitory computer readable storage medium including instructions that, when executed by a processing device, cause the processing device to: identify, in view of a first control flow graph associated with a first code fragment and a second control flow graph associated with a second code fragment, a first set of sections of the first code fragment and a second set of sections of the second code fragment, such that each section of the first set of sections has a corresponding section of the second set of sections; identify a first section of the first set of sections, wherein the first section is not syntactically equivalent to a corresponding second section of the second set of sections; and responsive to determining that the first section is not syntactically equivalent to the corresponding second section, find that the first code fragment is not semantically equivalent to the second code fragment.

Example 17 is the non-transitory computer readable medium of example 16, wherein the processing device is further to: responsive to determining that the first section comprises a call to a first function and that the corresponding second section comprises a call to a corresponding second function, identify a third code fragment associated with a definition of the first function and a corresponding fourth code fragment associated with a definition of the corresponding second function; and identify a first portion of the third code fragment, wherein the first portion is not syntactically equivalent to a corresponding second portion of the corresponding fourth code fragment.

Example 18 is the non-transitory computer readable medium of example 16, wherein the processing device is further to: responsive to determining that the first section comprises a call to a first function and that the corresponding second section does not comprise a call to a corresponding second function, determine that the first section is not syntactically equivalent to the corresponding second section.

Example 19 is the non-transitory computer readable medium of example 16, wherein the processing device is further to: responsive to determining that the first section is syntactically equivalent to the corresponding second section: determine whether there is a dependence relation between a first operation of the first section and a second operation of the first section; and in response to determining there is a dependence relation between the first operation and the second operation, perform semantic comparison between the first section and the corresponding second section. Example 20 is the non-transitory computer readable medium of example 16, wherein to find that the first code fragment is not semantically equivalent to the second code fragment, the processing device is to: responsive to determining that the first data type does not correspond to the second data type, find that the first section is not semantically equivalent to the corresponding second section.

Example 21 is the non-transitory computer readable medium of example 20, wherein to determine whether the first data type corresponds to the second data type, the processing device is to: determine a first memory offset, based on a first label of the first data type, that is to be assigned to the first label and a second memory offset, based on a second label of the second data type, that is to be assigned to the second label; and responsive to determining that the first label does not correspond to the second label and the first memory offset does not correspond to the second memory offset, find that the first data type is not semantically equivalent to the second data type.

Example 22 is the non-transitory computer readable medium of example 21, wherein the processing device is further to: responsive to determining that the first label does not correspond to the second label and the first memory offset corresponds to the second memory offset, determining whether a first field associated with the first label corresponds to a second field associated with the second label; and responsive to determining that the first field does not correspond to the second field, finding that the first data type is not semantically equivalent to the second data type.

Example 23 is the non-transitory computer readable medium of example 20, wherein to determine whether the first data type corresponds to the second data type, the processing device is further to: responsive to determining that the first data type occupies a larger amount of space at a first memory component than an amount of space occupied by the second data type at a second memory component, find that the first data type is not semantically equivalent to the second data type.

Example 24 is the non-transitory computer readable medium of example 16, wherein the processing device is further to: provide, to a user of a processing device, at least one of: an indication that the first code fragment is not semantically equivalent to the second code fragment, or a location identifier associated with the first section, wherein the location identifier indicates a first location of the first code fragment that is not semantically equivalent to a second location of the second code fragment.

Example 25 is a system comprising: a physical network interface card; a memory; a processing device coupled to the memory and the physical network interface card, the processing device to: identify, in view of a first control flow graph associated with a first code fragment and a second control flow graph associated with a second code fragment, a first set of sections of the first code fragment and a second set of sections of the second code fragment, such that each section of the first set of sections has a corresponding section of the second set of sections; identify a first section of the first set of sections, wherein the first section comprises a call to a first function and wherein a corresponding second section of the second set of sections does not comprise a call to a corresponding second function; and responsive to determining that the first section is not syntactically equivalent to the corresponding second section, find that the first code fragment is not semantically equivalent to the second code fragment.

Example 26 is the system of example 25, wherein to find that the first code fragment is not semantically equivalent to the second code fragment, the processing device is to: identify a third set of sections from a third code fragment associated with a definition of the first function, wherein each section of the third set of sections has a second corresponding second section of the second set of sections; identify a third section of the third set of sections, wherein the third section is not syntactically equivalent to a second corresponding second section of the second set of sections; and responsive to determining that the third section is not syntactically equivalent to the second corresponding second section, find that the first section is not semantically equivalent to the corresponding second section.

Example 27 is the system of example 25, wherein to identify the third section of the third set of sections, the processing device is to: responsive to determining that the third section comprises a call to a second function and that the second corresponding second section comprises a call to a corresponding third function, identify a fourth code fragment of the first control flow graph associated with a definition of the second function and a corresponding fifth code fragment of the second control flow graph associated with a definition of the corresponding third function; and identify a first portion of the fourth code fragment, wherein the first portion is not syntactically equivalent to a corresponding second portion of the corresponding fifth code fragment.

Example 28 is the system of example 25, wherein the processing device is further to: responsive to determining that the third section comprises the call to the second function and that the second corresponding second section does not comprise the call to the corresponding third function, determining that the third section is not syntactically equivalent to the second corresponding second section.

Example 29 is the system of example 25, wherein the processing device is further to: responsive to determining that the third section is syntactically equivalent to the corresponding second section: determine whether there is a dependence relation between a first operation associated with a definition of first function and a second operation associated with the definition of the first function; and in response to determining there is a dependence relation between the first operation and the second operation, perform semantic comparison between the third section and the corresponding second section. Example 30 is the system of example 25, wherein the process device is to: provide, to a user of the processing device, at least one of: an indication that the first code fragment is not semantically equivalent to the second code fragment, or a location identifier associated with the first section, wherein the location identifier indicates a first location of the first code fragment that is not semantically equivalent to a second location of the second code fragment.

Example 31 is an electronic device, comprising: a memory, a processing device coupled to the memory, the processing device to: identify, in view of a first control flow graph associated with a first code fragment and a second control flow graph associated with a second code fragment, a first set of sections of the first code fragment and a second set of sections of the second code fragment, such that each section of the first set of sections has a corresponding section of the second set of sections; identify a first section of the first set of sections, wherein the first section is not syntactically equivalent to a corresponding second section of the second set of sections; and responsive to determining that the first section is not syntactically equivalent to the corresponding second section, find that the first code fragment is not semantically equivalent to the second code fragment.

Example 32 is the electronic device of example 31, wherein the processing device is further to: responsive to determining that the first section comprises a call to a first function and that the corresponding second section comprises a call to a corresponding second function, identify a third code fragment associated with a definition of the first function and a corresponding fourth code fragment associated with a definition of the corresponding second function; and identify a first portion of the third code fragment, wherein the first portion is not syntactically equivalent to a corresponding second portion of the corresponding fourth code fragment.

Example 33 is the electronic device of example 31, wherein the processing device is further to: responsive to determining that the first section comprises a call to a first function and that the corresponding second section does not comprise a call to a corresponding second function, determine that the first section is not syntactically equivalent to the corresponding second section.

Example 34 is the electronic device of example 31, wherein the processing device is further to: responsive to determining that the first section is syntactically equivalent to the corresponding second section: determine whether there is a dependence relation between a first operation of the first section and a second operation of the first section; and in response to determining there is a dependence relation between the first operation and the second operation, perform semantic comparison between the first section and the corresponding second section.

Example 35 is the electronic device of example 31, wherein to find that the first code fragment is not semantically equivalent to the second code fragment, the processing device is to: responsive to determining that the first data type does not correspond to the second data type, find that the first section is not semantically equivalent to the corresponding second section.

Example 36 is the electronic device of example 35, wherein to determine whether the first data type corresponds to the second data type, the processing device is to: determine a first memory offset, based on a first label of the first data type, that is to be assigned to the first label and a second memory offset, based on a second label of the second data type, that is to be assigned to the second label; and responsive to determining that the first label does not correspond to the second label and the first memory offset does not correspond to the second memory offset, find that the first data type is not semantically equivalent to the second data type.

Example 37 is the electronic device of example 36, wherein the processing device is further to: responsive to determining that the first label does not correspond to the second label and the first memory offset corresponds to the second memory offset, determining whether a first field associated with the first label corresponds to a second field associated with the second label; and responsive to determining that the first field does not correspond to the second field, finding that the first data type is not semantically equivalent to the second data type.

Example 38 is the electronic device of example 35, wherein to determine whether the first data type corresponds to the second data type, the processing device is further to: responsive to determining that the first data type occupies a larger amount of space at a first memory component than an amount of space occupied by the second data type at a second memory component, find that the first data type is not semantically equivalent to the second data type.

Example 39 is the electronic device of example 21, wherein the processing device is further to: provide, to a user of a processing device, at least one of: an indication that the first code fragment is not semantically equivalent to the second code fragment, or a location identifier associated with the first section, wherein the location identifier indicates a first location of the first code fragment that is not semantically equivalent to a second location of the second code fragment.

What is claimed is:

1. A method comprising:
   identifying, in view of a first control flow graph associated with one or more first code fragments and a second control flow graph associated with one or more second code fragments, a first set of sections of the one or more first code fragments and a second set of sections of the one or more second code fragments, such that each section of the first set of sections has a corresponding section of the second set of sections;
   identifying a first section of the first set of sections and a corresponding second section of the second set of sections;
   determining whether the first section is syntactically equivalent to the corresponding second section in view of one or more function calls included in the first section and the corresponding second section;
   responsive to determining that the first section is not syntactically equivalent to the corresponding second section in view of the one or more function calls included in the first section and the corresponding second section, performing semantic comparison of a portion of the one or more first code fragments comprising the first section and a portion of the one or more second code fragments comprising the corresponding second section; and
   providing a location identifier associated with the first section, wherein the location identifier indicates a first location of the one or more first code fragments that is not semantically equivalent to a second location of the one or more second code fragments.

2. The method of claim 1, wherein determining whether the first section is syntactically equivalent to the corresponding second section comprises:
   responsive to determining that the first section comprises a first call to a first function and that the corresponding second section comprises a second call to a corresponding second function, identifying a third code fragment associated with a first definition of the first function and a corresponding fourth code fragment associated with a second definition of the corresponding second function; and
   identifying a first portion of the third code fragment, wherein the first portion is not syntactically equivalent to a corresponding second portion of the corresponding fourth code fragment.

3. The method of claim 1, further comprising:
   responsive to determining that the first section comprises a first call to a first function and that the corresponding second section does not comprise a second call to a corresponding second function, determining that the first section is not syntactically equivalent to the corresponding second section.

4. The method of claim 1 further comprising:
   responsive to determining that the first section is syntactically equivalent to the corresponding second section:
      determining whether there is a dependence relation between a first operation of the first section and a second operation of the first section; and
      in response to determining there is a dependence relation between the first operation and the second operation, performing semantic comparison between the first section and the corresponding second section.

5. The method of claim 1, wherein finding that the one or more first code fragments is not semantically equivalent to the one or more second code fragments comprises:
   responsive to determining that a first data type does not correspond to a second data type, finding that the first section is not semantically equivalent to the corresponding second section.

6. The method of claim 5, wherein determining whether the first data type corresponds to the second data type comprises:
- determining a first memory offset, based on a first label of the first data type, that is to be assigned to the first label and a second memory offset, based on a second label of the second data type, that is to be assigned to the second label; and
- responsive to determining that the first label does not correspond to the second label and the first memory offset does not correspond to the second memory offset, finding that the first data type is not semantically equivalent to the second data type.

7. The method of claim 6, further comprising:
- responsive to determining that the first label does not correspond to the second label and the first memory offset corresponds to the second memory offset, determining whether a first field associated with the first label corresponds to a second field associated with the second label; and
- responsive to determining that the first field does not correspond to the second field, finding that the first data type is not semantically equivalent to the second data type.

8. The method of claim 5, wherein determining whether the first data type corresponds to the second data type further comprises:
- responsive to determining that the first data type occupies a larger amount of space at a first memory component than an amount of space occupied by the second data type at a second memory component, finding that the first data type is not semantically equivalent to the second data type.

9. The method of claim 1, further comprising:
- providing an indication that the one or more first code fragments is not semantically equivalent to the one or more second code fragments.

10. A system comprising:
- a memory; and
- a processing device coupled to the memory, to:
  - identify, in view of a first control flow graph associated with one or more first code fragments and a second control flow graph associated with one or more second code fragments, a first set of sections of the one or more first code fragments and a second set of sections of the one or more second code fragments, such that each section of the first set of sections has a corresponding section of the second set of sections;
  - identify a first section of the first set of sections, wherein the first section comprises a first call to a first function;
  - responsive to determining that a corresponding second section of the second set of sections does not comprise a second call to a corresponding second function, determine whether the first section is not syntactically equivalent to the corresponding second section;
  - responsive to determining that the first section is not syntactically equivalent to the corresponding second section, find that a portion of the one or more first code fragments comprising the first section is not semantically equivalent to a portion of the one or more second code fragments comprising the corresponding second section; and
  - provide a location identifier associated with the first section, wherein the location identifier indicates a first location of the one or more first code fragments that is not semantically equivalent to a second location of the one or more second code fragments.

11. The system of claim 10, wherein to find that the one or more first code fragments is not semantically equivalent to the one or more second code fragments, the processing device is to:
- identify a third set of sections from a third code fragment associated with a first definition of the first function, wherein each section of the third set of sections has a second corresponding second section of the second set of sections;
- identify a third section of the third set of sections, wherein the third section is not syntactically equivalent to a second corresponding second section of the second set of sections; and
- responsive to determining that the third section is not syntactically equivalent to the second corresponding second section, find that the first section is not semantically equivalent to the corresponding second section.

12. The system of claim 11, wherein to identify the third section of the third set of sections, the processing device is to:
- responsive to determining that the third section comprises a third call to a second function and that the second corresponding second section comprises a fourth call to a corresponding third function, identify a fourth code fragment of the first control flow graph associated with a third definition of the second function and a corresponding fifth code fragment of the second control flow graph associated with a fourth definition of the corresponding third function; and
- identify a first portion of the fourth code fragment, wherein the first portion is not syntactically equivalent to a corresponding second portion of the corresponding fifth code fragment.

13. The system of claim 11, wherein the processing device is further to:
- responsive to determining that the third section comprises a third call to a second function and that the second corresponding second section does not comprise a fourth call to a corresponding third function, determine that the third section is not syntactically equivalent to the second corresponding second section.

14. The system of claim 11, wherein the processing device is further to:
- responsive to determining that the third section is syntactically equivalent to the corresponding section:
  - determine whether there is a dependence relation between a first operation associated with a first definition of first function and a second operation associated with the first definition of the first function; and
  - in response to determining there is a dependence relation between the first operation and the second operation, perform semantic comparison between the first section and the corresponding second section.

15. The system of claim 10, wherein the processing device is further to:
- provide an indication that the one or more first code fragments is not semantically equivalent to the one or more second code fragments.

16. A non-transitory computer readable storage medium including instructions that, when executed by a processing device, cause the processing device to:
- identify, in view of a first control flow graph associated with one or more first code fragments and a second control flow graph associated with one or more second code fragments, a first set of sections of the one or more first code fragments and a second set of sections of the one or more second code fragments, such that each section of the first set of sections has a corresponding section of the second set of sections;

identify a first section of the first set of sections and a corresponding second section of the second set of sections;

determine whether the first section is syntactically equivalent to the corresponding second section in view of one or more function calls included in the first section and the corresponding second section;

responsive to determining that the first section is not syntactically equivalent to the corresponding second section in view of the one or more function calls included in the first section and the corresponding second section, find that a portion of the one or more first code fragments comprising the first section is not semantically equivalent to a portion of the one or more second code fragments comprising the corresponding second section; and provide a location identifier associated with the first section, wherein the location identifier indicates a first location of the one or more first code fragments that is not semantically equivalent to a second location of the one or more second code fragments.

17. The non-transitory computer readable storage medium of claim 16, wherein to determine whether the first section is syntactically equivalent to the corresponding second section, the processing device is to:

responsive to determining that the first section comprises a first call to a first function and that the corresponding second section comprises a second call to a corresponding second function, identify a third code fragment associated with a first definition of the first function and a corresponding fourth code fragment associated with a second definition of the corresponding second function; and identify a first portion of the third code fragment, wherein the first portion is not syntactically equivalent to a corresponding second portion of the corresponding fourth code fragment.

18. The non-transitory computer readable storage medium of claim 16, wherein the processing device is further to:
responsive to determining that the first section comprises a first call to a first function and that the corresponding second section does not comprise a second call to a corresponding second function, determine that the first section is not syntactically equivalent to the corresponding second section.

19. The non-transitory computer readable storage medium of claim 16, wherein the processing device is further to:
responsive to determining that the first section is syntactically equivalent to the corresponding second section:
determine whether there is a dependence relation between a first operation of the first section and a second operation of the first section; and
in response to determining there is a dependence relation between the first operation and the second operation, perform semantic comparison between the first section and the corresponding second section.

20. The non-transitory computer readable storage medium of claim 16, wherein to find that the one or more first code fragments is not semantically equivalent to the one or more second code fragments, the processing device is to:
responsive to determining that a first data type does not correspond to a second data type, find that the first section is not semantically equivalent to the corresponding second section.

* * * * *